United States Patent [19]
Morrison et al.

[11] Patent Number: 6,032,128
[45] Date of Patent: Feb. 29, 2000

[54] METHOD AND APPARATUS FOR DETECTING ITEM PLACEMENT AND ITEM REMOVAL DURING OPERATION OF A SELF-SERVICE CHECKOUT TERMINAL

[75] Inventors: James Morrison, Suwanee; Dusty L. Lutz, Lawrenceville, both of Ga.

[73] Assignee: NCR Corporation, Dayton, Ohio

[21] Appl. No.: 08/990,241

[22] Filed: Dec. 15, 1997

[51] Int. Cl.[7] .............................. G06F 17/00; A47F 9/04
[52] U.S. Cl. ............................... 705/23; 705/23; 705/25; 705/26; 235/462; 235/383; 235/467; 186/1; 186/61
[58] Field of Search .............................. 705/23; 235/462; 186/61

[56] References Cited

U.S. PATENT DOCUMENTS

| | | | |
|---|---|---|---|
| 3,836,755 | 9/1974 | Ehrat | 235/61.7 R |
| 4,676,343 | 6/1987 | Humble et al. | 186/61 |
| 4,779,706 | 10/1988 | Mergenthaler | 186/61 |
| 4,788,467 | 11/1988 | Johnson | 177/50 |
| 4,792,018 | 12/1988 | Humble et al. | 186/61 |
| 4,940,116 | 7/1990 | O'Connor et al. | 186/61 |
| 4,964,053 | 10/1990 | Humble | 364/466 |
| 5,083,638 | 1/1992 | Schneider | 186/61 |
| 5,125,465 | 6/1992 | Schneider | 177/50 |
| 5,378,860 | 1/1995 | Dingfelder et al. | 177/25.19 |
| 5,635,906 | 6/1997 | Joseph | 340/572 |
| 5,747,784 | 5/1998 | Walter et al. | 235/462 |

*Primary Examiner*—James P. Trammell
*Assistant Examiner*—Nga B. Nguyen
*Attorney, Agent, or Firm*—Maginot, Addison & Moore

[57] ABSTRACT

A method of providing security during operation of a checkout terminal, with the terminal having a first scale, includes the step of storing a first identification code associated with an input item in a memory in response to entry of the input item into the terminal. The method also includes the step of detecting the weight of the input item with the first scale and storing an input weight value associated with the weight of the input item in the memory in response thereto. The method further includes the step of retrieving a second identification code associated with a removal item from the memory in response to a user voiding entry of the removal item. Moreover, the method includes the step of detecting the weight of the removal item with the first scale and generating a removal weight value associated with the weight of the removal item in response thereto. The method yet further includes the step of generating a wrong-item-removed control signal if (1) the first identification code is the same as the second identification code, and (2) the input weight value does not match the removal weight value.

21 Claims, 15 Drawing Sheets

METHOD AND APPARATUS FOR DETECTING ITEM PLACEMENT AND ITEM REMOVAL DURING OPERATION OF A SELF-SERVICE CHECKOUT TERMINAL

CROSS REFERENCE

Cross reference is made to copending U.S. patent application Ser. No. 08/990,240, entitled "Method and Apparatus for Detecting Item Substitutions During Entry of an Item into a Self-Service Checkout Terminal" by Dusty Lutz, which is assigned to the same assignee as the present invention, and which is filed concurrently herewith.

TECHNICAL FIELD OF THE INVENTION

The present invention relates generally to a retail checkout terminal, and more particularly to a method and apparatus for detecting item placement and item removal during operation of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout Terminal. In traditional checkout systems, the clerk employed by the retailer to operate the checkout terminal provides a level of security against theft or other improprieties. However, in the case of a self-service checkout terminal, the terminal itself must provide the necessary security. Such security includes preventing a customer from either inadvertently or intentionally placing an item in a grocery bag without scanning the item, or voiding one item from entry, but removing a second item of lesser value, or no item at all, from the grocery bag. Thus, another concern when evaluating a self-service checkout terminal is the level of security provided against illicit use of the self-service checkout terminal by customers.

Therefore, self-service checkout terminals have heretofore been designed with security systems which monitor the use of the self-service checkout terminal. For example, weight scales have been incorporated into self-service checkout terminals to monitor the manner in which a customer handles or otherwise processes items during operation of the self-service checkout terminal. In particular, self-service checkout terminals have heretofore been designed with a weight scale positioned under a bagging area associated with the self-service checkout terminal. After a customer scans or otherwise enters an item into the self-service checkout terminal, a processing unit associated with the self-service checkout terminal retrieves a stored weight value associated with the item. More specifically, the processing unit retrieves the stored weight value of the item by using the product identification code (e.g. a Universal Product Code or UPC) associated with the item to select the corresponding stored weight value from a number of values contained in a pre-defined, master product database. What is meant herein by the term "master product database" is a central database which includes product information (e.g. description, price, and weight) associated with every item that is sold by the retailer. When the scanned item is placed into a grocery bag positioned on the weight scale, the weight scale determines a measured weight value of the item which may be used by the processing unit to compare to the stored weight value of the item. In particular, the processing unit compares the stored weight value of the item to the measured weight value of the item in order to determine if the item that was placed in the grocery bag is the same item that was entered by the customer.

For example, if the customer scans a can of soup with the scanner, the product identification code associated with the can of soup is used by the processing unit to determine the stored weight value associated with the soup. In particular, the processing unit communicates with a memory device associated with the self-service checkout terminal in order to retrieve the stored weight value corresponding to the can of soup (e.g. 10¾ ounces) from the master product database. When the customer places the can of soup into a grocery bag, the weight of the can of soup is determined by the weight scale. In particular, if the customer places the can of soup into the grocery bag, the weight scale measures a weight corresponding to the can of soup (e.g. 10¾ ounces) thereby allowing the processing unit to conclude that a proper transaction has occurred. However, if the customer places a pound of steak into the grocery bag, the weight scale will measure a weight corresponding to the steak (i.e. 16 ounces) thereby causing the processing unit to conclude that an item substitution has occurred.

Such security systems which utilize a weight scale in the manner described above have a number of drawbacks associated therewith. For example, the effectiveness of the above described security system is undesirably dependent on the accuracy of the data stored within the master product database. In particular, if a stored weight value associated with a given item is inaccurate, the self-service checkout terminal will erroneously conclude that an item substitution has occurred, even if the proper item is placed in the grocery bag. Hence, it is imperative that the data within the master product database be maintained accurately. Such maintenance is particularly laborious in the grocery industry where the weight of a given item may change a number of times during a given period of time. For example, the weight of a given item may change if the item is featured in a promotion (e.g. a bottle of detergent which is normally sold in a 48-ounce bottle is being sold in a 58-ounce bottle at the same price). Moreover, the weight of the item may change if the manufacturer thereof changes the item's packaging (e.g. the detergent manufacturer replaces a plastic bottle with a glass bottle of the same size). If such a changes in the weight of the item occurs, the retailer must first update the master product database to reflect the promotional weight value of the item (e.g. 58 ounces in the case of the detergent), and then update the master product database a second time to return the weight value to its original value (e.g. 48 ounces in the case of the detergent) upon completion of the promotion. Given the number of different items which are sold in a typical grocery store, it should be appreciated that such maintenance of the master product database is quite labor intensive thereby undesirably increasing costs associated with the items sold in the grocery store.

In addition, there exists a number of improprieties the occurrence of which may not be detected with such security systems. For example, security systems which have heretofore been designed generally do not detect the occurrence of an impropriety in which the customer voids a first item from a checkout transaction, but removes a second, less expensive item from the grocery bag.

What is needed therefore is a self-service checkout terminal which detects improper item removals during operation thereof. What is also needed is a self-service checkout terminal which detects substitution of an item during a voiding process without use of a master product database. What is further needed is a self-service checkout terminal which detects if an item that has not been entered into the terminal is placed into a grocery bag.

SUMMARY OF THE INVENTION

In accordance with a first embodiment of the present invention, there is provided method of providing security during operation of a checkout terminal. The method includes the step of creating a database during a checkout procedure which includes a first record corresponding to an input item entered into the terminal during the checkout procedure, the first record including (1) a first identification code associated with the input item, and (2) an input weight value corresponding to the weight of the input item. The method also includes the step of determining a second identification code associated with a removal item in response to a user voiding entry of the removal item. The method further includes the step of detecting the weight of the removal item and generating a removal weight value in response thereto. Moreover, the method includes the step of generating a wrong-item-removed control signal if (1) the first identification code is the same as the second identification code, and (2) the input weight value does not match the removal weight value.

In accordance with a second embodiment of the present invention, there is provided a method of providing security during operation of a checkout terminal, with the terminal having a first scale. The method includes the step of storing a first identification code associated with an input item in a memory in response to entry of the input item into the terminal. The method also includes the step of detecting the weight of the input item with the first scale and storing an input weight value associated with the weight of the input item in the memory in response thereto. The method further includes the step of retrieving a second identification code associated with a removal item from the memory in response to a user voiding entry of the removal item. Moreover, the method includes the step of detecting the weight of the removal item with the first scale and generating a removal weight value associated with the weight of the removal item in response thereto. The method yet further includes the step of generating a wrong-item-removed control signal if (1) the first identification code is the same as the second identification code, and (2) the input weight value does not match the removal weight value.

In accordance with a third embodiment of the present invention, there is provided a checkout terminal. The checkout terminal includes a first weight scale, and a memory. The checkout terminal also includes a mechanism for storing a first identification code associated with an input item in the memory in response to entry of the input item into the terminal. The checkout terminal also includes a mechanism for detecting the weight of the input item with the first weight scale and storing an input weight value associated with the weight of the input item in the memory in response thereto. The checkout terminal further includes a mechanism for retrieving a second identification code associated with a removal item from the memory in response to a user voiding entry of the removal item. Moreover, the checkout terminal includes a mechanism for detecting the weight of the removal item with the first weight scale and generating a removal weight value associated with the weight of the removal item in response thereto. The checkout terminal yet further includes a mechanism for generating a wrong-item-removed control signal if (1) the first identification code is the same as the second identification code, and (2) the input weight value does not match the removal weight value.

It is therefore an object of the present invention to provide a new and useful checkout terminal.

It is a further object of the present invention to provide an improved checkout terminal.

It is yet another object of the present invention to provide a new and useful method of providing security during operation of a checkout terminal.

It is moreover an object of the present invention to provide an improved method of providing security during operation of a checkout terminal.

It is moreover an object of the present invention to provide a self-service checkout terminal which detects substitution of an item during a voiding process without use of a master product database.

The above and other objects, features, and advantages of the present invention will become apparent from the following description and the attached drawings.

DETAILED DESCRIPTION OF THE INVENTION

Figure 1:
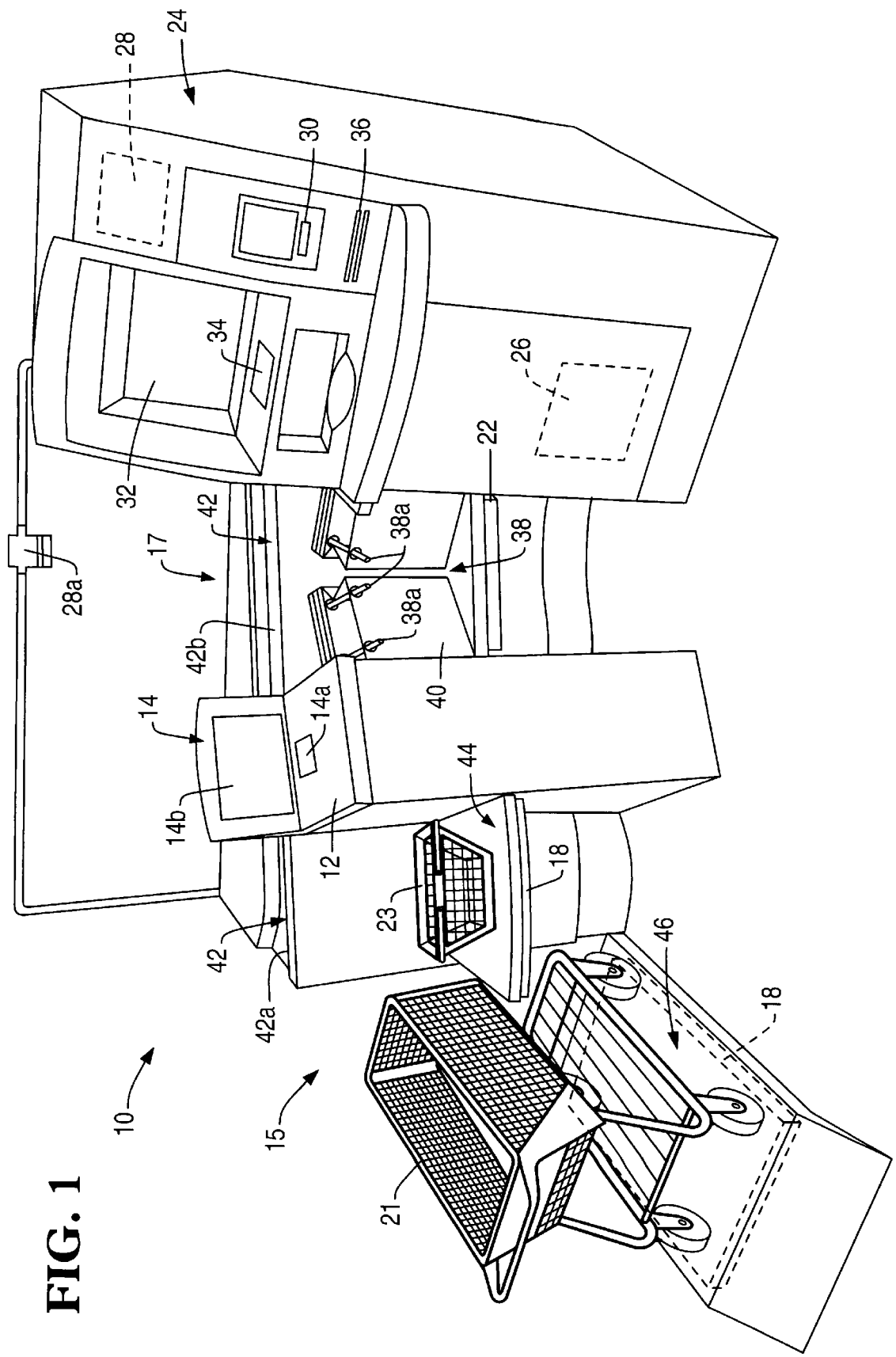
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
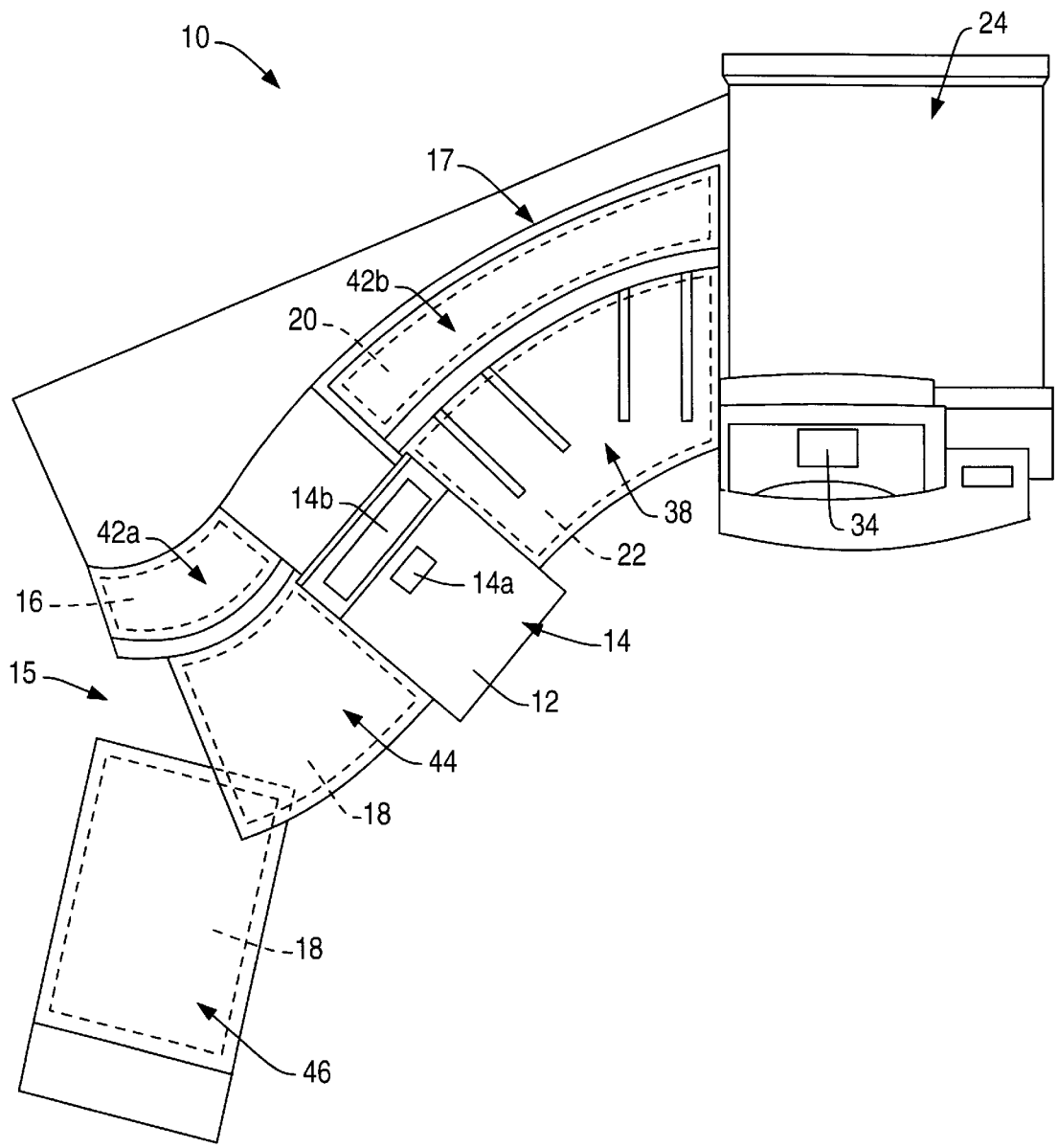
FIG. 2 is a top elevational view of the self-service checkout terminal of FIG. 1 (note that the grocery cart 21, the grocery hand basket 23, the video camera 28a, and the grocery bags 40 have been removed for clarity of description)

Referring now to FIGS. 1 and 2, there is shown a self-service checkout terminal 10 for use in a retail business such as a grocery store. Although the checkout terminal 10 is shown in FIGS. 1 and 2, and hereinafter described in detail as a self-service checkout terminal, it should be appreciated that the present invention may also be used in an assisted checkout terminal (i.e. a retail checkout terminal which is operated by an employee of the retail business such as a checkout clerk).

The self-service checkout terminal 10 includes a product scale 12, a scanner 14, a pre-scan shelf scale 16, a cart/basket scale 18, a post-scan shelf scale 20, a bagwell scale 22, an automated teller machine (ATM) 24, and a processing unit 26. The ATM 24 includes a video system 28, a card reader 30, a display monitor 32, a data input device 34, and a printer 36.

The self-service checkout terminal 10 also includes a bagwell 38 for accommodating one or more grocery bags 40, a counter 42, and a basket shelf 44. The counter 42 defines an arcuate surface as shown in FIG. 2. What is meant herein by the term "arcuate surface" is a surface which possess a curved or bowed shape. Such an arcuate surface allows the counter 42 to be positioned relatively close to both the scanner 14 and the bagwell 38 thereby permitting the counter 42 to function as a "set-aside surface" for use by the user during operation of the self-service checkout terminal 10. What is meant herein by the term "set-aside surface" is a surface on which items may be temporarily placed prior to either being (1) scanned or otherwise entered, or (2) loaded into one of the grocery bags 40 in the bagwell 38 if the item has already been scanned or otherwise entered.

Such set-aside surfaces are necessary to allow the user to selectively choose the order in which items are scanned or otherwise entered. Moreover, such set-aside surfaces are necessary to allow a user to selectively choose the order in which items are loaded into the grocery bags 40. For example, if the user scanned a loaf of bread, the user may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside surface or shelf 42a, and a post-scan set-aside surface or shelf 42b. In particular, the scanner 14 divides the counter 42 into the pre-scan set-aside shelf 42a which is upstream of the scanner 14, and the post-scan set-aside shelf 42b which is downstream from the scanner 14. Tile terms "upstream" and "downstream" are used to be consistent with the flow of items through the self-service checkout terminal 10 during a typical checkout procedure. In particular, an item enters at the area proximate the pre-scan set-aside surface 42a then flows in a downstream direction to be scanned at the scanner 14 so as to enter a product code associated with the item. Once the product code associated with the item is entered, the item flows from the scanner 14 in a downstream direction to the post-scan set-aside surface 42b or the bagwell 38.

The bagwell 38 is disposed between the scanner 14 and the ATM 24 as shown in FIG. 1. The bagwell 38 includes a number of posts 38a which cooperate to support a number of the grocery bags 40. The bagwell 38 is configured to allow two or more grocery bags 40 to be accessed by the user at any given time. In particular, the posts 38a are of a sufficient length to secure a number of unopened grocery bags 40 along with two or more opened grocery bags 40 thereby allowing a user to selectively load various item types into the grocery bags 40. For example, the user may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

The pre-scan shelf scale 16 is positioned in order to determine the weight of an item or items positioned on the pre-scan shelf 42a. In particular, if a user removes an item from the pre-scan shelf 42a in order to scan or otherwise enter the item into the self-service checkout terminal 10, the pre-scan shelf scale 16 may be used to determine the weight of the item by detecting a weight decrease associated with removal of the item from the pre-scan shelf 42a. Moreover, the pre-scan shelf 42a functions as a "return area" of the self-service checkout terminal 10. More specifically, if the user voids an item from entry during the checkout procedure, the user is instructed via a message displayed on the display monitor 32 to position the voided item on the pre-scan shelf 42*a*. Hence, the pre-scan shelf scale 16 may be used to determine the weight associated with the voided item by detecting a weight increase associated with placement of the voided item on the pre-scan shelf 42*a*.

The cart/basket scale 18 is positioned in order to determine the weight of an item or items positioned in either (1) a grocery cart 21 positioned on a cart unloading platform 46, and/or (2) a grocery hand basket 23 positioned on the basket shelf 44. In particular, if a user removes an item from either the grocery cart 21 or the grocery hand basket 23 in order to scan or otherwise enter the item into the self-service checkout terminal 10, the cart/basket scale 18 may be used to determine the weight of the item by detecting a weight decrease associated with removal of the item from either the grocery cart 21 or the grocery hand basket 23, respectively. It should be appreciated that the cart/basket scale 18 may be embodied as two separate scales (i.e. a first scale for detecting weight changes on the cart unloading platform 46, and second scale for detecting weight changes on the basket shelf 44), or may preferably be embodied as a single, integrated weight scale which is mechanically coupled to both the cart unloading platform 46 and the basket shelf 44.

From the above discussion, it should be appreciated that the pre-scan shelf scale 16 and the cart/basket scale 18 cooperate to monitor placement of items into, and removal of items from, a pie-scan area 15 associated with the self-service checkout terminal 10. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan shelf 42*a*, the cart unloading platform 46, and the basket shelf 44.

The post-scan shelf scale 20 is positioned in order to determine the weight of an item or items positioned on the post-scan shelf 42*b*. In particular, if a user places an item on the post-scan shelf 42*b*, the post-scan shelf scale 20 may be used to determine the weight of the item by detecting a weight increase associated with placement of the item on the post-scan shelf 42*b*. Alternatively, if a user removes an item from the post-scan shelf 42*b*, the post-scan shelf scale 20 may be used to determine the weight of the item by detecting a weight decrease associated with removal of the item from the post-scan shelf 42*b*.

The bagwell scale 22 is positioned in order to determine the weight of an item or items positioned in the grocery bags 40. In particular, if a user places an item in one of the grocery bags 40, the bagwell scale 22 may be used to determine the weight of the item by detecting a weight increase associated with placement of the item in the grocery bag 40. Alternatively, if a user removes an item from one of the grocery bags 40, the bagwell scale 22 may be used to determine the weight of the item by detecting a weight decrease associated with removal of the item from the grocery bag 40.

From the above discussion, it should be appreciated that the post-scan shelf scale 20 and the bagwell scale 22 cooperate to monitor placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan shelf 42*b* and the bagwell 38 (including the grocery bags 40 therein). Moreover, it should be further appreciated that the post-scan shelf scale 20 and the bagwell scale 22 may be embodied as two separate scales, or may alternatively be embodied as a single, integrated weight scale which is mechanically coupled to both the base of the bagwell 38 and the post-scan shelf 42*b*.

The display monitor 32 displays instructions which serve to guide a user through a checkout procedure. For example, an instruction is displayed on the display monitor 32 which instructs the user to remove an item from the grocery cart 21 and enter the item into the self-service checkout terminal 10 by (1) passing the item over the scanner 14, or (2) placing the item on the product scale 12 in order to obtain the weight of the item. The display monitor 32 may be a known touch screen monitor which can generate data signals when certain areas of the screen are touched by a user.

Figure 3:
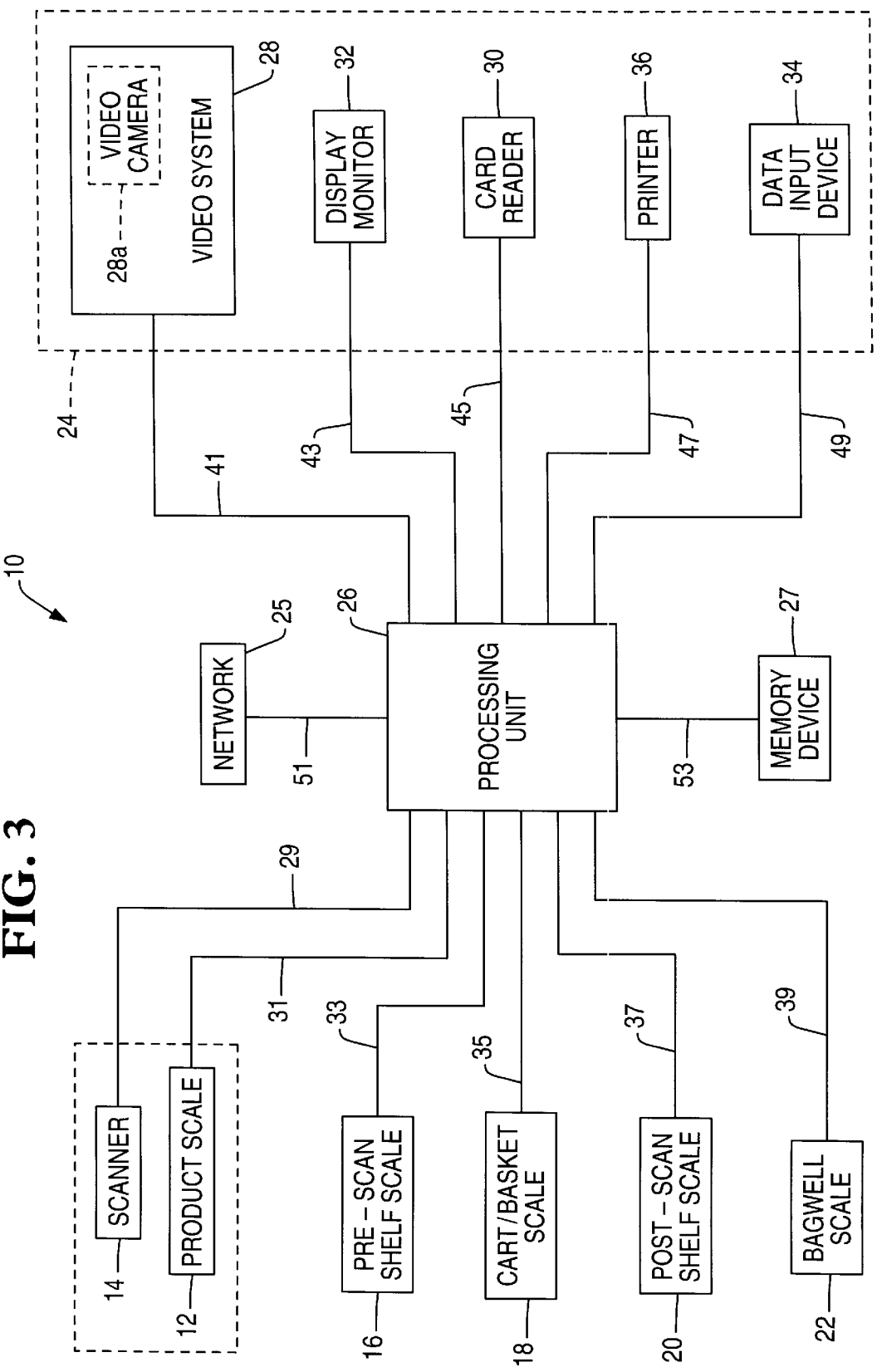
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the pre-scan shelf scale 16, the cart/basket scale 18, the post-scan shelf scale 20, the bagwell scale 22, the video system 28, the card reader 30, the display monitor 32, the data input device 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the user of the self-service checkout terminal 10 scans an item which includes a bar code across the scanning windows 14*a*, 14*b*, an output signal is generated on the communication line 29

The processing unit 26 is coupled to the product scale 12 via a data communication line 31. In particular, when an item is placed thereon, the product scale 12 generates an output signal on the data communication line 31 indicative of the weight of the item.

The processing unit 26 is coupled to the pre-scan shelf scale 16 via a data communication line 33. In particular, when an item is placed on the pre-scan shelf 42*a*, the pre-scan shelf scale 16 generates an output signal on the data communication line 33 indicative of the weight of the item. Similarly, when an item is removed from the pre-scan shelf 42*a*, the pre-scan shelf scale 16 generates an output signal on the data communication line 33 indicative of the weight of the removed item.

The processing unit 26 is coupled to the cart/basket scale 18 via a data communication line 35. In particular, when an item is removed from either the grocery cart 21 or the grocery hand basket 23, the cart/basket scale 18 generates an output signal on the data communication line 35 indicative of the weight of the removed item.

The processing unit 26 is coupled to the post-scan shelf scale 20 via a data communication line 37. In particular, when an item is placed on the post-scan shelf 42*b*, the post-scan shelf scale 20 generates an output signal on the data communication line 37 indicative of the weight of the item. Similarly, when an item is removed from the post-scan shelf 42*b*, the post-scan shelf scale 20 generates an output signal on the data communication line 37 indicative of the weight of the removed item.

The processing unit 26 is coupled to the bagwell scale 22 via a data communication line 39. In particular, when an item is placed in one of the grocery bags 40, the bagwell scale 22 generates an output signal on the data communication line 39 indicative of the weight of the item added to the grocery bag 40. Similarly, when an item is removed from one of the grocery bags 40, the bagwell scale 22 generates an output signal on the data communication line 39 indicative of the weight of the item removed from the grocery bag 40.

The processing unit 26 communicates with the video system 28 via a communication line 41. The video system 28 includes a video camera 28*a* (see also FIG. 1), and is included in the self-service checkout terminal 10 to enhance the security thereof. The video system 28 may be a known closed-circuit surveillance video system which provides video images to a security control area associated with the grocery store. Alternatively, the video system 28 may be configured to include the hardware and software necessary to provide motion pattern recognition thereby providing security to the self-service checkout terminal 10 without the need for store personnel (e.g. a security officer employed by the grocery store) to monitor the video images generated by the video system. In particular, the video system 28 may include a frame grabber (not shown) and a processing system (not shown) such as a personal computer (PC). The PC and the frame grabber are collectively referred to as a video processor. The video processor receives a standard video signal format, such as RS-170, NTSC, CCIR, or PAL, from the video camera 28*a*.

Video output signals from the video camera 28*a* are input to the frame grabber. The frame grabber operates to convert the analog video signals from the video camera 28*a* into a digital image which is stored within a memory for subsequent processing by the video processor. Once representations of the stream of digital images from the video camera 28*a* are sequentially stored in memory, the video processor may begin to analyze or otherwise process the video image in order to monitor the manner in which the user handles items during operation of the self-service checkout terminal 10. For example, the video system 28 may be used to determine if the user moves an item in a manner indicative of an attempt to scan the item with the scanner 14. One video system 28 which is suitable for use in the present invention is disclosed in U.S. Provisional patent application Ser. No. 60/045,001 entitled "Motion Pattern Recognition for a Self Checkout System" which was filed on Feb. 7, 1997, by Ralph Crabtree, which is incorporated herein by reference, and which is assigned to the same assignee as the present invention.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the user touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The data input device 34 is coupled to the processing unit 26 through a data communication line 49. The data input device 34 may include one or more of a known keypad or a touch pad. In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to communicate with a paging system (not shown) or the like which pages or otherwise alerts the retailer's personnel as described further below. In addition, the processing unit 26 communicates with the network 25 to obtain information such as pricing information on an item being scanned or weighed, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the self-service checkout terminal 10. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

Moreover, the memory device 27 maintains a transaction level weight database. The transaction level weight database includes a record associated with the weight of each item that is placed in a post-scan area 17 (i.e. each item that is placed on the post-scan shelf 42*b* or into one of the grocery bags 40). In particular, when an item is placed on the post-scan shelf 42*b* or into one of the grocery bags 40, the post-scan shelf scale 20 or the bagwell scale 22, respectively, generates an output signal indicative of the weight of the item which is sent to the processing unit 26. The processing unit 26 then communicates with the memory device 27 so as to cause a record including (1) the product code associated with the item, and (2) the weight of the item to be added to transaction level weight database. Hence, at the end of a given checkout procedure, a record corresponding to the weight of each item entered into the self-service checkout terminal 10 will be included in the transaction level database. As shall be discussed in more detail below, the records in the transaction level weight database may then be analyzed by the processing unit 26 to determine if an item substitution has occurred. In particular, if a user commits an impropriety by scanning a first item of a lesser value, and thereafter placing an item of greater value into one of the grocery bags 40, the user will generally do so with two different items included in the user's items for purchase. More specifically, the user is likely to commit an item substitution by entering the product identification code associated with the item of lesser value and placing the item of greater value into the grocery bag 40, and thereafter at a point in time later in the transaction, re-entering the product identification code associated with the item of lesser value and placing it into the grocery bag 40. Hence, two records corresponding to the product identification code associated with item of lesser value will be in the transaction level weight database, yet the two records will have different weight values associated therewith (presuming the item of lesser value has a different weight than the item of greater value). When the processing unit 26 determines that two records within the transaction level database have (1) identical product identification codes, and (2) different weight values, the processing unit 26 concludes that an item substitution has occurred.

The memory device 27 is also provided to maintain a number of electronic logs associated with operation of the self-service checkout terminal 10. More specifically, the memory device 27 electronically maintains an event log and a suspicion log.

The event log is provided to track or otherwise tally the number of occasions in which a given user operates the self-service checkout terminal 10 improperly. In particular, the event log tracks those occasions in which the user unintentionally operated the self-service checkout terminal 10 improperly, along with those occasions in which it can be inferred with a high degree of confidence that the user intentionally operated the self-service checkout terminal 10 improperly for illicit purposes such as theft. For example, if the processing unit 26 determines that the user placed an item into the post-scan area 17 without having previously scanned or otherwise entered the item, an entry is made in the event log. This is true since the user may have unintentionally operated the scanner 14 incorrectly thereby preventing the scanner 14 from reading the bar code printed on the item. However, the possibility does exist that the user may have intentionally prevented the scanner 14 from reading the bar code printed on the item (e.g. the user may have placed his or her thumb over the bar code during the scanning attempt). Therefore, an entry is made in the event log.

The suspicion log on the other hand, is provided to track or otherwise tally only the number of occasions in which a given user operates the self-service checkout terminal 10 improperly, and it can be inferred with a high degree of confidence that the user was intentionally operating the self-service checkout terminal 10 improperly for illicit reasons such as theft. For example, if the processing unit 26 determines that an item substitution has occurred, an entry is made in the suspicion log.

It should be appreciated that a separate, predetermined threshold value may be established for the event log and the suspicion log. More specifically, a retailer may establish a threshold value for each of the logs that once exceeded causes the processing unit 26 to communicate with the network 25 in order to page or otherwise alert the retailer's personnel as to certain events surrounding the operation of the self-service checkout terminal 10 by a given user. For example, a customer service manager may be paged to assist the user if the event log exceeds a value of three (3). Moreover, a security officer may be paged to audit or otherwise investigate the user's transaction if the suspicion log exceeds a value of one and one-half (1½).

Figure 4:
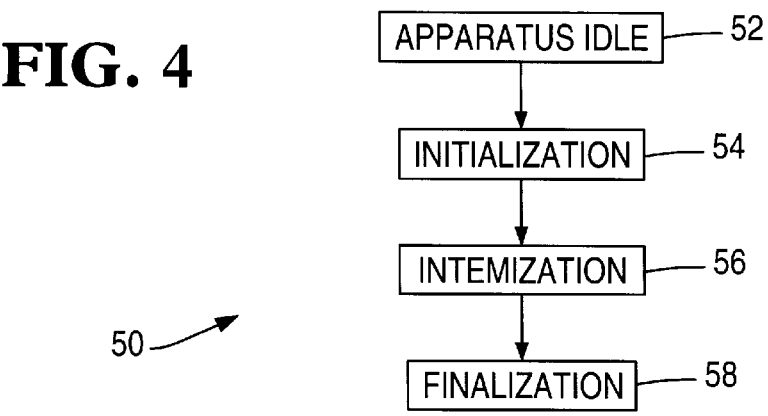
FIG. 4 is a flowchart setting forth a general procedure for checking out items through the self-service checkout terminal of FIG. 1.

Referring now to FIG. 4, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 32 which instruct the user to (1) touch a particular area of the display monitor 32 or push a particular button on the data input device 34 in order to select a desired method of payment, and/or (2) identify himself or herself by inserting a shopping card, debit card, credit card, or smart card into the card reader 30.

At the completion of the initialization step 54, the routine 50 advances to an itemization step 56 where the user enters individual items for purchase by scanning the items across the scanner 14. Moreover, in step 56 the user enters items, such as produce items or the like, by weighing with the items with the product scale 12, and thereafter entering a product lookup code associated with the item via either the data input device 34 or by touching a particular area of the display monitor 32. Further, in step 56 the user may enter an item by manually entering the product code associated with the item via use of the data input device 34. Such manual entry of an item may be necessary for items which would otherwise be entered via the scanner 14 if the bar code printed on the item is not readable by the scanner 14. It may also be necessary during step 56 for the user to void entry of an item from the checkout procedure via use of the scanner 14 or the data input device 34. It should be appreciated that the self-service checkout terminal 10 may be configured such that the routine 50 allows experienced users of the self-service checkout terminal 10 to bypass the initialization step 52 thereby advancing directly to the itemization step 56. In such a configuration, the experienced user would begin the transaction by scanning or otherwise entering his or her first item for purchase.

At the completion of the itemization step, the routine 50 advances to a finalization step 58 in which (1) a grocery receipt is printed by the printer 36, and (2) payment is tendered by either inserting currency into a cash acceptor (not shown), charging a credit card account, or decreasing a value amount stored on a smart card or debit card via the card reader 30. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figure 5A:
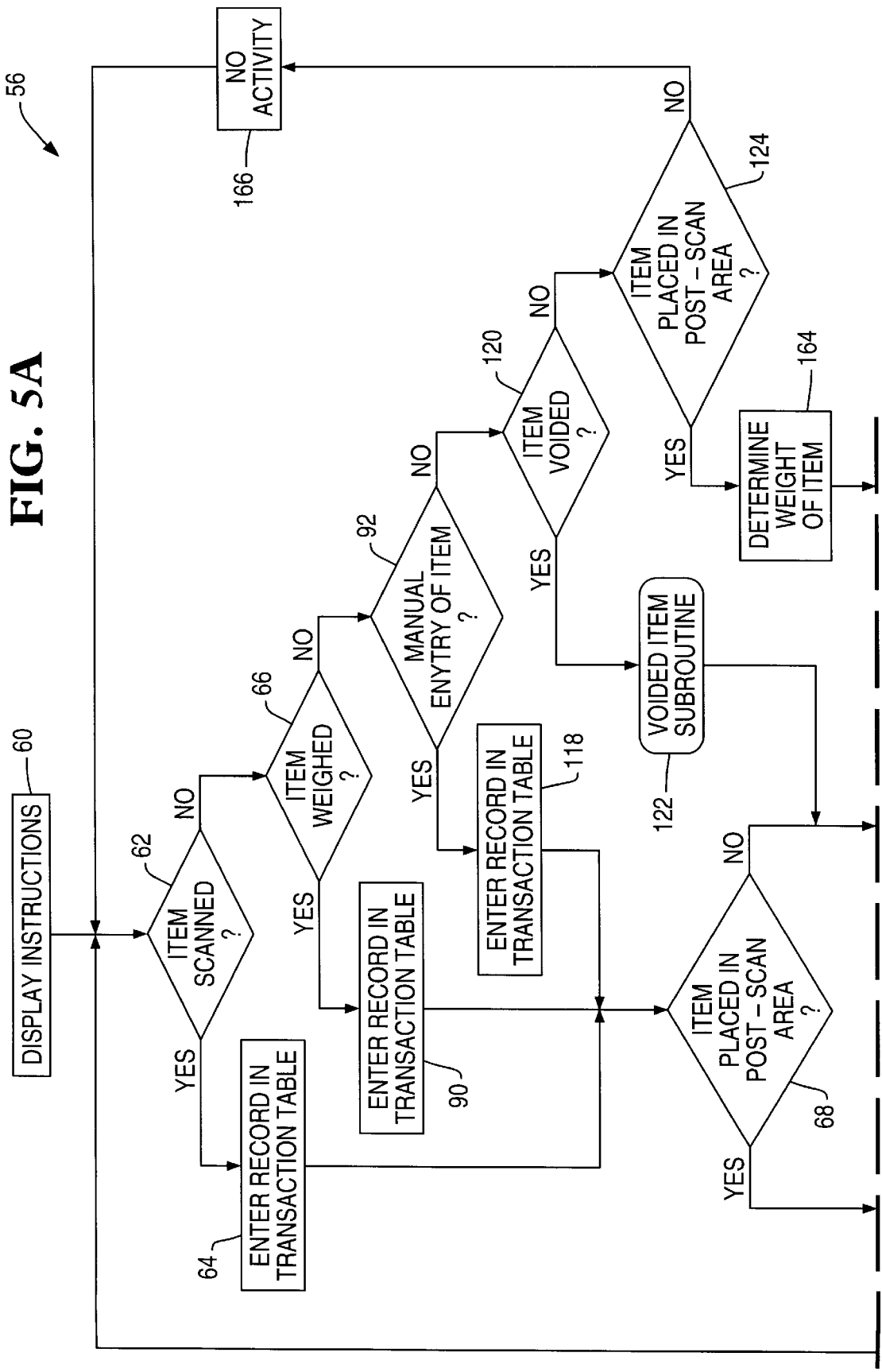
FIGS. 5A–5B is a flowchart setting forth in detail the itemization step 56 of the general procedure of FIG. 4.
Figure 5B:
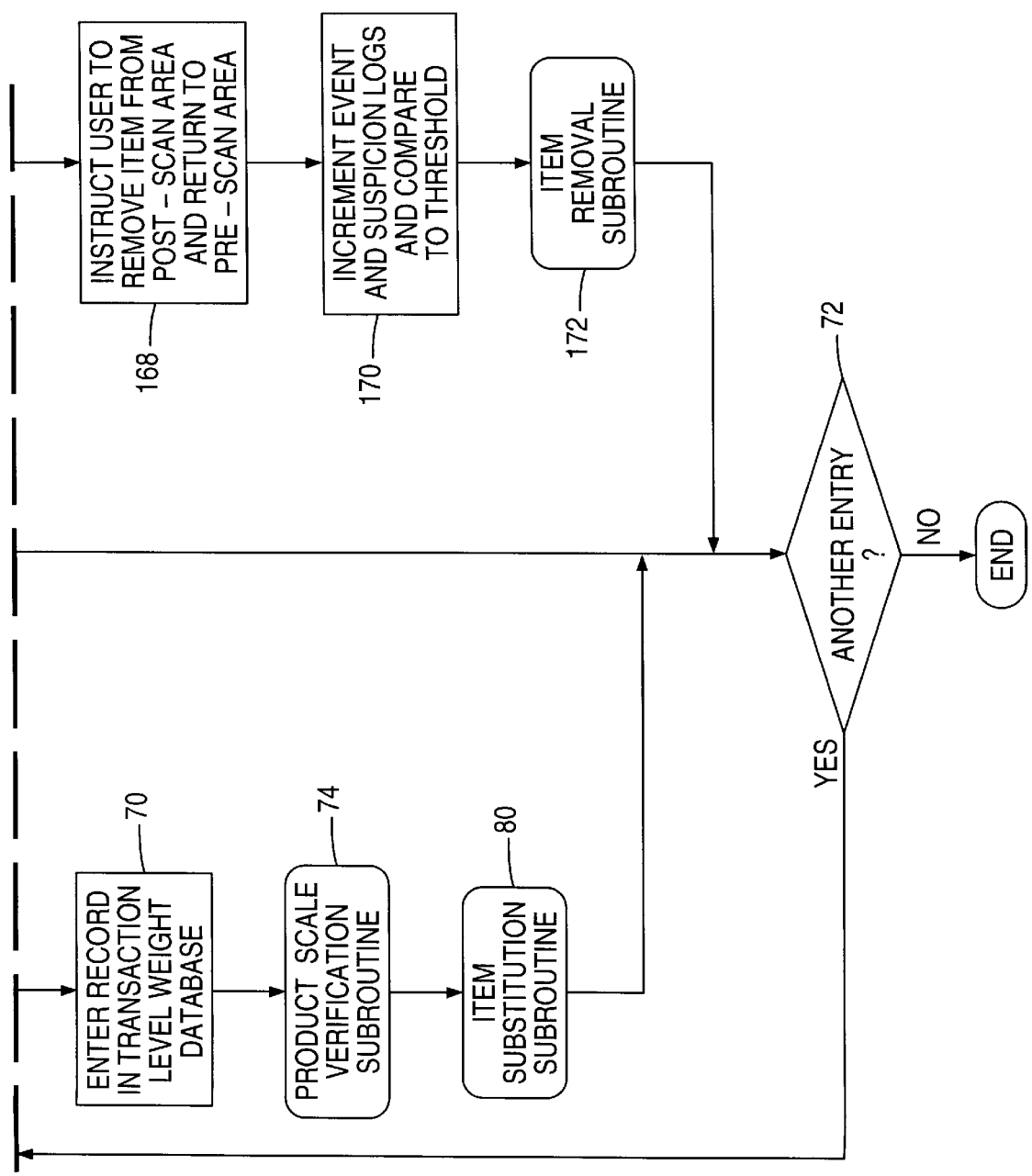

Referring now to FIG. 5, there is shown a flowchart setting forth the itemization step 56 in greater detail. After the initialization step 54 (see FIG. 4) is completed, the routine 56 advances to step 60 where a message is displayed on the display monitor 32 which instructs the user to either (1) pass or otherwise scan individual items across or adjacent the scanner 14 with the bar code containing the item's product identification code facing the scanning windows 14a, 14b, (2) place an individual item on the product scale 12 in order to be weighed, or (3) to manually enter the product identification code associated with an item with the data input device 34, or any combination thereof.

The routine 56 then advances to step 62 where the processing unit 26 scans or reads the data communication line 29 to determine whether the scanner 14 has successfully read or otherwise captured the product identification code associated with the item. More specifically, the scanner 14 generates an output signal which is sent to the processing unit 26 once the scanner 14 successfully reads the product identification code associated with the item. If the product identification code is successfully read from the item, an item-entered control signal is generated and the routine 56 advances to step 64. If the product identification code is not successfully read from the item, the routine 56 advances to step 66.

In step 64, the processing unit 26 adds a record of the item scanned in step 62 to the transaction table. In particular, the processing unit 26 communicates with the network 25 to obtain product information (e.g. description and price) associated with the scanned item. Thereafter, the processing unit 26 updates the transaction table. More specifically, the processing unit 26 generates an output signal which is sent to the memory device 27 which causes the transaction table to be updated in the memory device 27 to include the product information associated with the scanned item. A valid-use control signal is then generated, and the routine 56 then advances to step 68.

In step 68, the processing unit 26 determines if the scanned item is placed into the post-scan area 17 of the self-service checkout terminal 10. More specifically, the bagwell scale 22 generates an output signal which is sent to the processing unit 26 once the bagwell scale 22 has detected the user placing the scanned item into one of the grocery bags 40. Moreover, the user may opt not to immediately place the scanned item into one of the grocery bags. For example, if the user scanned a loaf of bread, the user may wait to place the bread into one of the grocery bags 40 until it is nearly full thereby preventing the bread from being crushed. Hence, in step 68 the post-scan shelf scale 20 generates an output signal which is sent to the processing unit 26 once the post-scan shelf scale 20 has detected a user placing the scanned item onto the post-scan shelf 42a. In addition, the user may opt not to place the scanned item into the post-scan area 17 at all. For example, if the user scanned a pack of gum, the user may opt to place the gum into his or her pocket instead of placing the gum in the post-scan area 17. Hence, it should therefore be appreciated that although it is possible to configure the self-service checkout terminal 10 such that the user is required to place the item in the post-scan area 17 in step 68, the self-service checkout terminal 10 of the present invention is preferably configured such that the user is not required to place the item in the post-scan area 17 as described above. Therefore, if the user places the scanned item into the post-scan area 17 (i.e. into one of the grocery bags 40 or onto the post-scan shelf 42b), a detection control signal is generated and the routine 56 advances to step 70. However, if the user opts not place the scanned item into the post-scan area 17, the routine 56 advances to step 72.

In step 70, the processing unit 26 adds a record of the item placed in the post-scan area 17 in step 68 to the transaction level weight database. In particular, the processing unit 26 communicates with the post-scan shelf scale 20 or the bagwell scale 22 to determine the weight of the item placed in the post-scan area 17 in step 68. Thereafter, the processing unit 26 updates the transaction level weight database. More specifically, the processing unit 26 generates an output signal which is sent to the memory device 27 which causes the transaction level weight database to be updated in the memory device 27 to contain a record that includes (1) the product identification code, (2) the weight associated with the item that was placed in the post-scan area 17 in step 68 (i.e. an input item), and (3) a location code which indicates that the item is located in the post-scan area 17. The routine 56 then advances to a product scale verification subroutine 74.

Figure 6A:
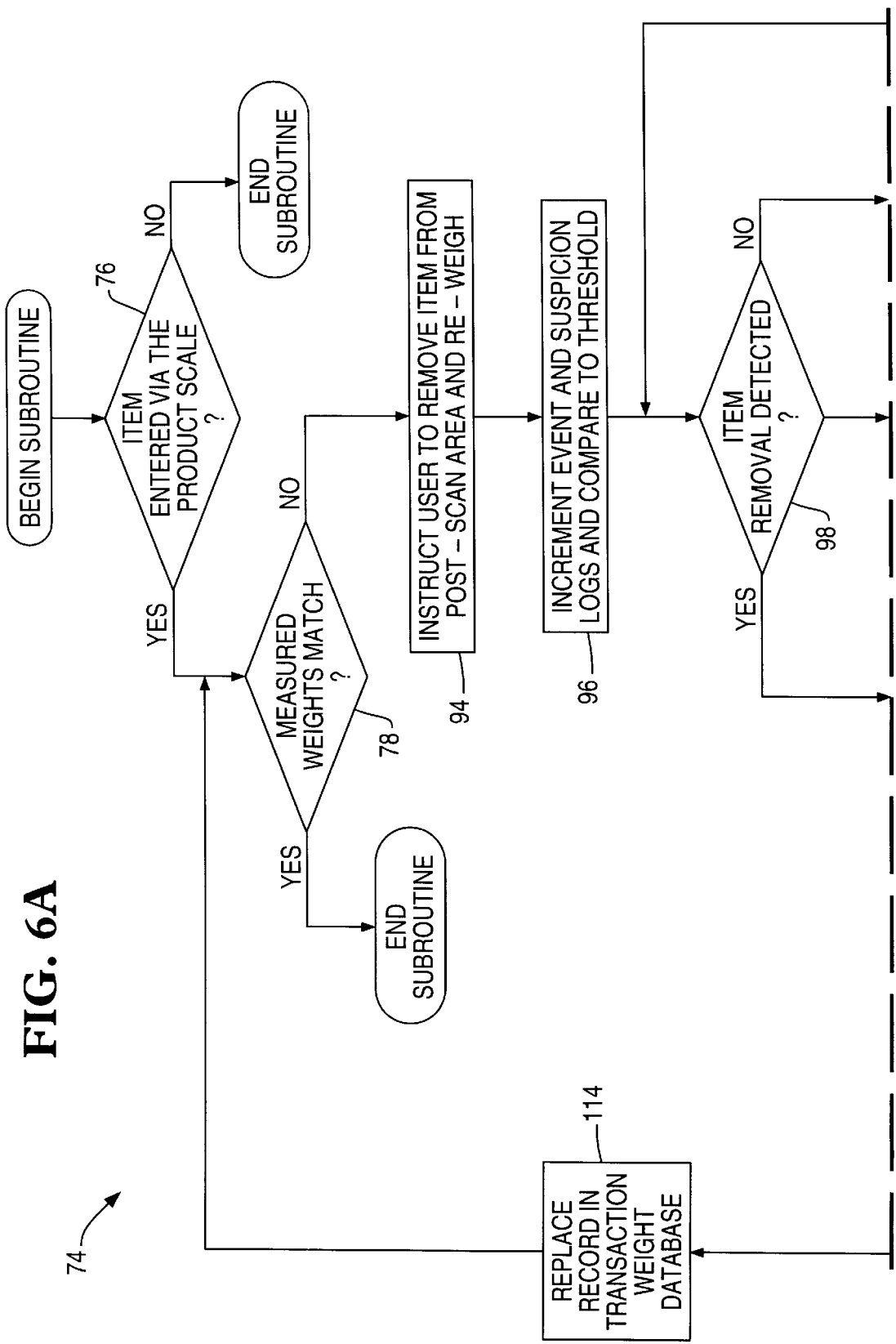
FIGS. 6A–6B is a flowchart setting forth in detail the product scale verification subroutine 74 of the itemization step of FIG. 5.
Figure 6B:
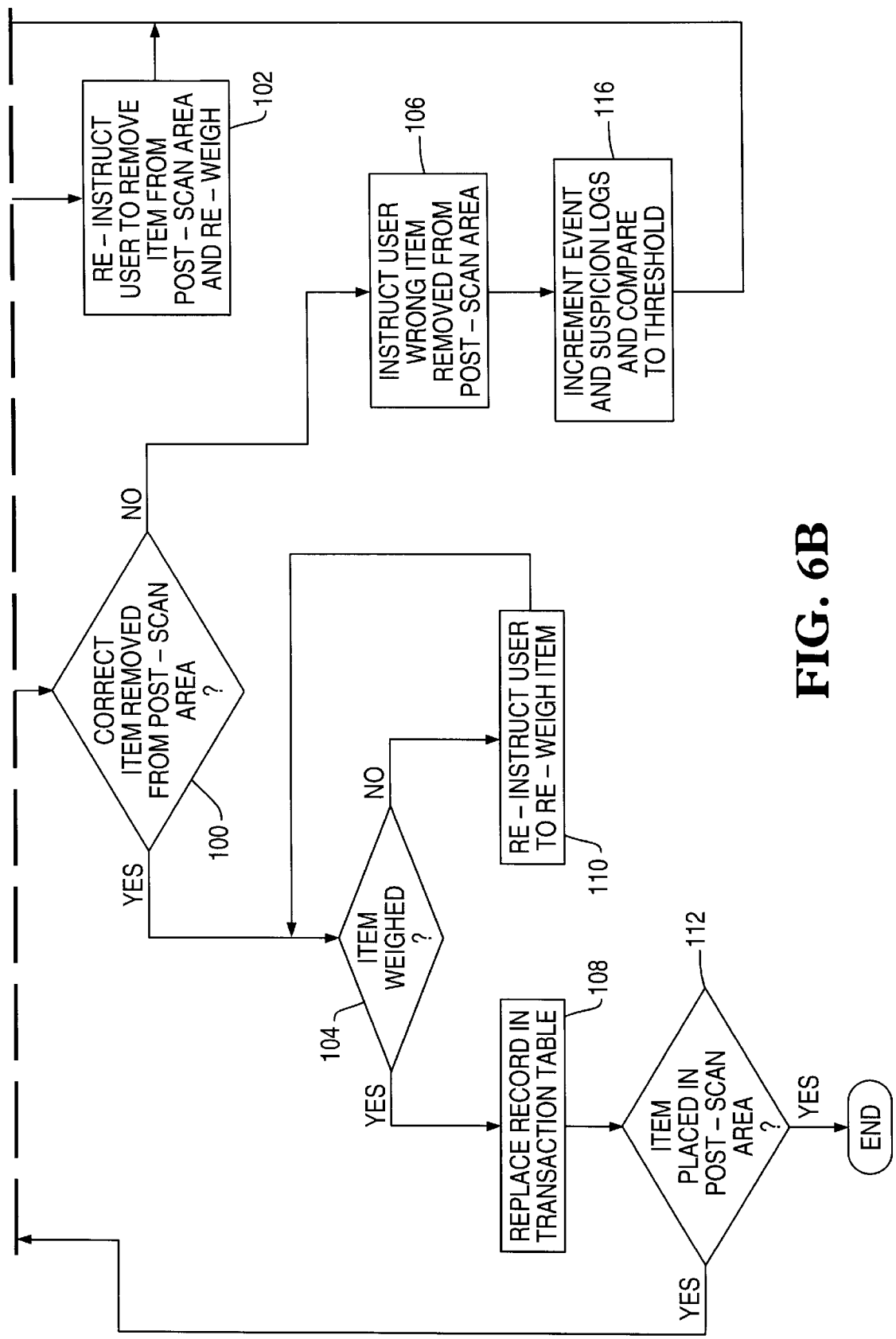

Referring now to FIG. 6, there is shown a flowchart setting forth the product scale verification subroutine 74 in greater detail. After completion of step 70 (see FIG. 5), the subroutine 74 advances to step 76. In step 76, the processing unit 26 determines if the item that was placed in the post-scan area 17 in step 68 had been previously weighed with the product scale 12. In particular, the processing unit 26 communicates with the memory device 27 to determine if the record in the transaction table corresponding to the item that was placed in post-scan area 17 includes a measured weight value which was determined by the product scale 12. If the item placed in the post-scan area 17 in step 68 was previously weighed by the product scale 12 (e.g. produce, meat items, or bulk food items), the subroutine 74 advances to step 78. If the item placed in the post-scan area 17 in step 68 was not previously weighed by the product scale 12, the subroutine 74 then ends thereby advancing the routine 56 to an item substitution subroutine 80 (see FIG. 5).

Since in the present discussion the item placed in the post-scan area 17 in step 68 was entered into the self-service checkout terminal 10 via use of the scanner 14 in step 62, a complete discussion of the product scale verification subroutine 74 is not warranted. However, the product scale subroutine 74 is discussed in detail below with regard to items that are entered in the self-service checkout terminal 10 via use of the product scale 12 (step 66).

Figure 7:
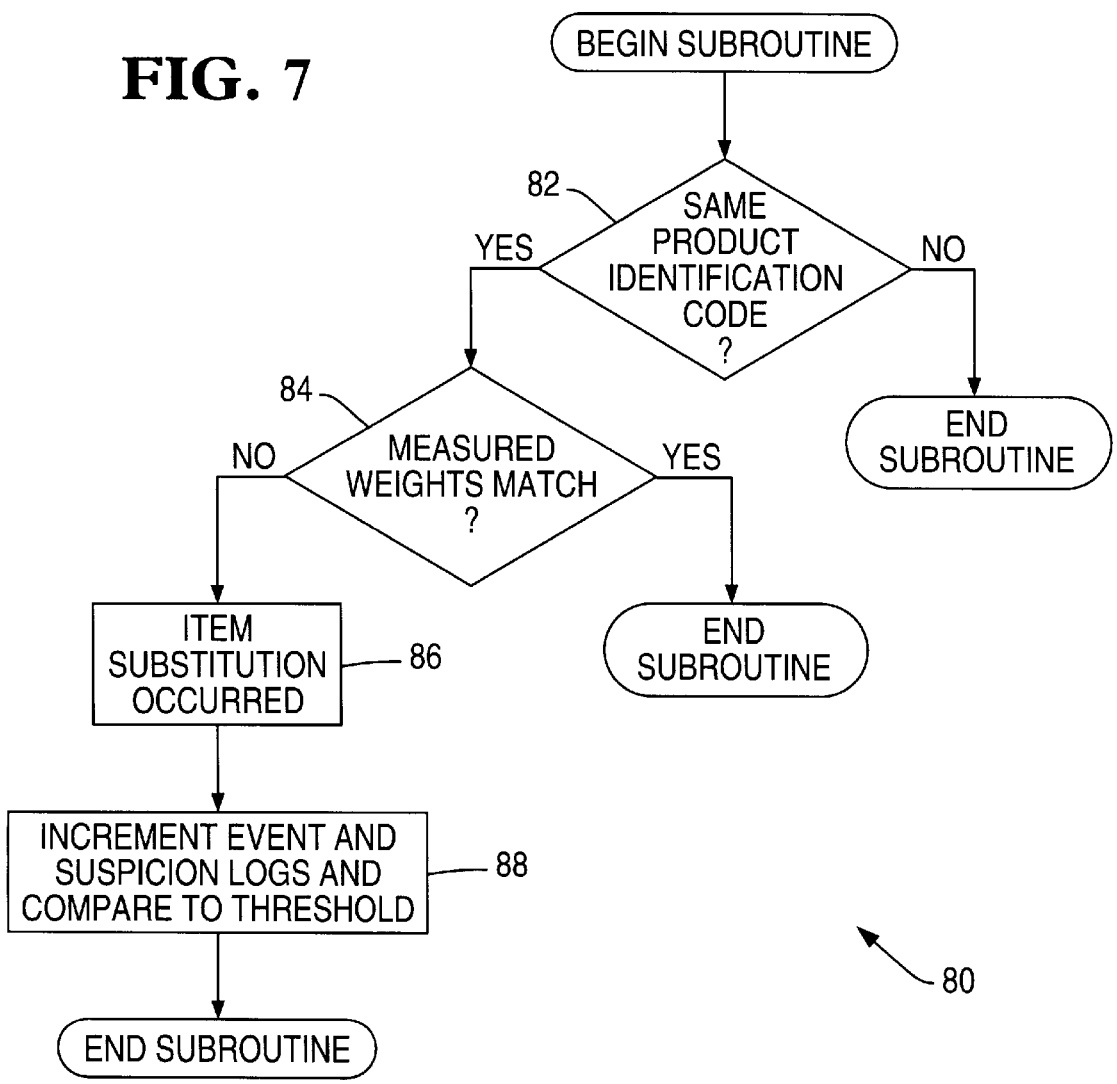
FIG. 7 is a flowchart setting forth in detail the item substitution subroutine 80 of the itemization step of FIG. 5.

Referring now to FIG. 7, there is shown a flowchart setting forth the item substitution subroutine 80 in greater detail. After completion of the product scale verification subroutine 74 (see FIG. 5), the subroutine 80 advances to step 82. In step 82, the processing unit 26 determines if the product identification code corresponding to the record added to the transaction level weight database in step 70 (see FIG. 5) is the same as the product identification code corresponding to any previously entered records in the transaction level weight database. In particular to step 82, the processing unit 26 communicates with the memory device 27 to determine if the item that was scanned in step 62 (see FIG. 5) has the same (i.e. an identical alphanumeric code) product identification code associated therewith as an item (or items) that was previously entered into the transaction level weight database. If the item scanned in step 62 has the same product identification code as an item that was previously entered into the transaction level weight database, the subroutine 80 advances to step 84. If the item scanned in step 62 does not have the same product identification code as an item that was previously entered into the transaction level weight database, a valid-entry Control signal is generated, and the subroutine 80 then ends thereby advancing the routine 56 to step 72 (see FIG. 5).

In step 84, the processing unit 26 determines if the stored weight values of the two (or more) items having the same product identification codes (i.e. the item was scanned in step 62 and the item that was previously entered in the transaction level weight database with the same product identification code) match one another. What is meant herein by the terms "match", "matches", or "matching" is that the magnitude of a first weight value is either equal to, or within a predetermined tolerance range of, the magnitude of a second weight value. Hence, in step 84, the processing unit 26 communicates with the memory device 27 to retrieve from the transaction level weight database (1) the stored weight value associated with the item that was scanned in step 62, and (2) the stored weight value associated with the item previously entered into the transaction level weight database having the same product identification code as the scanned item. Further in step 84, the processing unit 26 compares the two retrieved weight values so as to determine if the weight value associated with the item that was scanned in step 62 matches the weight value associated with the item previously entered into the transaction level weight database having the same product identification code as the scanned item. If the weight value associated with the item that was scanned in step 62 matches the weight value associated with the item previously entered into the transaction level weight database that has the same product identification code as the scanned item, a valid-entry control signal is generated and the subroutine 80 then ends thereby advancing the routine 56 to step 72 (see FIG. 5). If the weight value associated with the item that was scanned in step 62 does not match the weight value associated with the item previously entered into the transaction level weight database having the same product identification code as the scanned item, the subroutine advances to step 86.

In step 86, the processing unit 26 determines that an item substitution has occurred. More specifically, the processing unit 26 concludes that the user apparently entered the same item twice, but placed two different items in the post-scan area 17 because although two records in the transaction level weight database have the same product identification codes associated therewith, the two records do not have matching weight values associated therewith. Hence, the user apparently (1) entered a first item and then placed a second item in the post-scan area 17, and (2) thereafter re-entered the first item and then placed the first item in the post-scan area 17. Once the processing unit 26 has determined that an item substitution has occurred, an item substitution control signal is generated and the subroutine 80 advances to step 88.

In step 88, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 80 then ends thereby advancing the routine 56 to step 72 (see FIG. 5).

While the above use of the event log and suspicion log in step 88 has numerous advantages associated therewith, certain of these advantages may be achieved with other monitoring configurations. For example, the self-service checkout terminal 10 may be configured to page or otherwise summon security personnel upon every occurrence of an item substitution irrespective of the value of the event or suspicion logs. Moreover, the memory device 27 may be configured to include a separate log dedicated entirely to tracking the occurrences of item substitutions. It should be appreciated that in the case of where a separate item substitution log is maintained, a unique threshold value for such a log may be established. Such a unique threshold value may be constant (i.e. the magnitude of the threshold value remains the same despite the level of usage associated with the self-service checkout terminal 10), or may be variable (i.e. the magnitude of the threshold value may be reduced during periods of relatively high usage so as to increase the throughput associated with the self-service checkout terminal 10, or may alternatively be increased during periods of low usage so as to increase the security associated with the self-service checkout terminal 10).

As alluded to above, if subsequent to steps 82, 84, or 88 the subroutine 80 ends, the routine 56 is advanced to step 72 as shown in FIG. 5. In step 72, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 68 (see FIG. 5), if the user does not place the scanned item into the post-scan area 17, the routine 56 advances to step 72. As discussed above, in step 72 the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 62 (see FIG. 5), if an item is not scanned by the scanner 14, the routine 56 advances to step 66. In step 66, the processing unit 26 (1) scans or reads the communication line 31 to determine if the user has weighed an item with the product scale 12, and thereafter (2) scans or reads the communication lines 49 and 43 to determine if the user has entered a product lookup code associated with the weighed item via the data input device 34 or the touch screen associated with the display monitor 32, respectively. More specifically, the product scale 12 generates an output signal which is sent to the processing unit 26 once the product scale 12 has detected the weight of an item being placed thereon, whereas the data input device 34 or the display monitor 32 generates an output signal which is sent to the processing unit 26 once the user enters the product lookup code associated with the weighed item. It should be appreciated that the product lookup code associated with the item identifies the item (i.e. apples or bananas). Moreover, the product lookup code is used in conjunction with the weight of the item so as to define the product identification code associated with the item. In other words, the product identification code associated with an item includes (1) the identity of the item, and (2) the weight of the item. Hence, a one pound bunch of bananas would have the same product lookup code as a two pound bunch of bananas, but would have a different product identification code. Therefore, in step 66, if (1) an item is weighed with the product scale 12, and (2) the product lookup code associated with the item is entered either via the data input device 34 or the display monitor 32, an item-entered control signal is generated and the routine 56 advances to step 90. If (1) an item is not weighed with the product scale 12, or (2) the product lookup code associated with the item is not entered either via the data input device 34 or the display monitor 32, the routine 56 advances to step 92.

In step 90, the processing unit 26 adds a record of the item weighed in step 66 to the transaction table. In particular, the processing unit 26 communicates with the network 25 to obtain product information (e.g. description and price) associated with the weighed item. Thereafter, the processing unit 26 updates the transaction table. More specifically, the processing unit 26 generates an output signal which is sent to the memory device 27 which causes the transaction table to be updated in the memory device 27 to include the product information (e.g. description, price, and the weight of the item as determined by the product scale 12) associated with the weighed item. A valid-use control signal is then generated, and the routine 56 then advances to step 68.

As discussed above, in step 68 the processing unit 26 determines if the weighed item is placed into the post-scan area 17 of the self-service checkout terminal 10. More specifically, the bagwell scale 22 generates an output signal which is sent to the processing unit 26 once the bagwell scale 22 has detected the user placing the weighed item into one of the grocery bags 40. Moreover, in step 68 the post-scan shelf scale 20 generates an output signal which is sent to the processing unit 26 once the post-scan shelf scale 20 has detected the user placing the weighed item onto the post-scan shelf 42*a*. If the user places the weighed item into the post-scan area 17 (i.e. into one of the grocery bags 40 or onto the post-scan shelf 42*b*), a detection control signal is generated and the routine 56 advances to step 70. If the user does not place the weighed item into the post-scan area 17, the routine 56 advances to step 72.

In step 70, the processing unit 26 adds a record of the item placed in the post-scan area 17 in step 68 to the transaction level weight database. In particular, the processing unit 26 communicates with the post-scan shelf scale 20 or the bagwell scale 22 to determine the weight of the item placed in the post-scan area 17 in step 68. Thereafter, the processing unit 26 updates the transaction level weight database. More specifically, the processing unit 26 generates an output signal which is sent to the memory device 27 which causes the transaction level weight database to be updated in the memory device 27 to contain a record that includes (1) the product identification code, and (2) the weight associated with the item that was placed in the post-scan area 17 in step 68. The routine 56 then advances to the product scale verification subroutine 74.

As shown in FIG. 6, after completion of step 70 (see FIG. 5), the product scale verification subroutine 74 advances to step 76. In step 76, the processing unit 26 determines if the item that was placed in the post-scan area 17 in step 68 had been previously weighed with the product scale 12. In particular, the processing unit 26 communicates with the memory device 27 to determine if the record in the transaction table corresponding to the item that was placed in post-scan area 17 includes a measured weight value which was determined by the product scale 12. Since the item (e.g. a produce, meat, or bulk food item) placed in the post-scan area 17 in step 68 was previously weighed by the product scale 12 in step 66, the subroutine 74 advances to step 78. If the item placed in the post-scan area 17 in step 68 had not been previously weighed by the product scale 12, the subroutine 74 would end thereby advancing the routine 56 to the item substitution subroutine 80 (see FIG. 5).

In step 78, the processing unit 26 determines if the weight value of the item as measured by the product scale 12 matches the weight value of the item as measured by either the post-scan shelf scale 20 or the bagwell scale 22. In particular, the processing unit 26 communicates with the memory device 27 to retrieve the weight value of the item stored in the transaction table. As discussed above, the processing unit 26 caused the weight value of the item as measured by the product scale 12 to be stored in the transaction table once the user entered the product lookup code associated with the item. Moreover, the processing unit 26 communicates with the memory device 27 to retrieve the weight value of the item as measured by the post-scan shelf scale 20 or the bagwell scale 22 as determined in step 68. Thereafter, the processing unit compares the weight value of the item as measured by the product scale 12 with the weight value of the item as measured by either the post-scan shelf scale 20 or the bagwell scale 22. If the weight value of the item as measured by the product scale 12 matches the weight value of the item as measured by either the post-scan shelf scale 20 or the bagwell scale 22, the subroutine 78 then ends thereby advancing the routine 56 to the item substitution subroutine 80 (see FIG. 5). If the weight value of the item as measured by the product scale 12 does not match the weight value of the item as measured by either the post-scan shelf scale 20 or the bagwell scale 22, the subroutine 78 then advances to step 94.

In step 94, the processing unit determines that the user operated the product scale 12 improperly when the user weighed the item in step 66. This is true since the weight value of the item as measured by the product scale 12 during the user's operation thereof does not match the weight value of the item as measured by the either the post-scan shelf scale 20 or the bagwell scale 22. It should be appreciated that such a disparity in weight values may be caused by a number of different actions on the part of the user. For example, in order to erroneously decrease the measured weight of the item, the user may have (1) centered the item improperly on the product scale 12, (2) weighed a only portion of the item (e.g. weighed only one banana, but then placed four bananas in the grocery bag 40), (3) supported the item with his or her hand during weighing so as to prevent the entire weight of the item from being measured, (4) manipulated the scale plate (not shown) associated with the product scale 12 so as to restrict movement thereof, or (5) depressed the reset button (not shown) associated with the product scale 12 while the item was resting thereon. It should be noted that the above examples include instances where the user unintentionally operated the product scale 12 improperly, along with instances where the user may have been attempting to commit an impropriety such as theft.

Hence, in step 94 the processing unit 26 also causes a message to be displayed on the display monitor 32 which instructs the user to remove the item from the post-scan area 17 and thereafter re-weigh the item with the product scale 12. The subroutine 74 then advances to step 96.

In step 96, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 74 then advances to step 98.

In step 98, the processing unit 26 determines if the user removes the item from the post-scan area 17 as instructed. In particular, the post-scan shelf scale 20 or the bagwell scale 22 generates an output signal indicative of the measured weight of the item which is sent to the processing unit 26 once the post-scan shelf scale 20 or the bagwell scale 22 detects the item being removed from either the post-scan shelf 42b or from one of the grocery bags 40, respectively. If the user removes the item from the post-scan area 17, the subroutine 74 advances to step 100. If the user does not remove the item from the post-scan area 17 within a predetermined period of time, the subroutine 74 advances to step 102.

In step 100, the processing unit 26 determines if the correct item was removed from the post-scan area 17 in step 98. In particular, the processing unit 26 communicates with the memory device 27 so as to retrieve the stored weight value associated with the improperly weighed item from the transaction level weight database (as determined by the post-scan shelf scale 20 or the bagwell scale 22 when the improperly weighed item was placed in the post-scan area 17 in step 68 of FIG. 5). Thereafter, the processing unit 26 compares the retrieved weight value to the measured weight value from step 98. If the weight value of the item that was removed from the post-scan area 17 (as detected in step 98) matches the weight value of the item that was placed in the post-scan area 17 (as detected in step 68), the subroutine 74 advances to step 104. If the weight value of the item that was removed from the post-scan area 17 (as detected in step 98) does not match the weight value of the item that was placed in the post-scan area 17 (as detected in step 68), the subroutine 74 advances to step 106.

Step 104 follows the same procedure outlined above with regard to step 66. In particular, the processing unit 26 (1) scans or reads the communication line 31 to determine if the user has re-weighed the item with the product scale 12, and thereafter (2) scans or reads the communication lines 49 and 43 to determine if the user has re-entered the product lookup code associated with the item via the data input device 34 or the touch screen associated with the display monitor 32, respectively. More specifically, the product scale 12 generates an output signal which is sent to the processing unit 26 once the product scale 12 has detected the weight of the item being placed thereon, whereas the data input device 34 or the display monitor 32 generates an output signal which is sent to the processing unit 26 once the user enters the product lookup code associated with the re-weighed item. If (1) the item is re-weighed with the product scale 12, and (2) the product lookup code associated with the item is re-entered either via the data input device 34 or the display monitor 32, the subroutine 74 advances to step 108. If (1) the item is not re-weighed with the product scale 12, or (2) the product lookup code associated with the item is not re-entered either via the data input device 34 or the display monitor 32, the subroutine 74 advances to step 110.

In step 108, the processing unit 26 replaces the record of the item weighed in step 104 in the transaction table. In particular, the processing unit 26 generates an output signal which is sent to the memory device 27 which causes the transaction table to be updated in the memory device 27 to include the product information (e.g. description, price, and the revised weight of the item as determined by the product scale 12 in step 104) associated with the re-weighed item. In addition, the processing unit 26 generates an output signal which is sent to the memory device 27 which causes the previous record associated with the re-weighed item to be erased or otherwise removed from the transaction table. The subroutine 74 then advances to step 112.

Step 112 follows the same procedure outlined above with regard to step 68. In particular, the processing unit 26 determines if the re-weighed item is placed into the post-scan area 17 of the self-service checkout terminal 10. More specifically, the bagwell scale 22 generates an output signal which is sent to the processing unit 26 once the bagwell scale 22 has detected the user placing the re-weighed item into one of the grocery bags 40. Moreover, in step 68 the post-scan shelf scale 20 generates an output signal which is sent to the processing unit 26 once the post-scan shelf scale 20 has detected the user placing the re-weighed item onto the post-scan shelf 42a. If the user places the re-weighed item into the post-scan area 17 (i.e. into one of the grocery bags 40 or onto the post-scan shelf 42b), the subroutine 74 advances to step 114. If the user does not place the re-weighed item into the post-scan area 17, the subroutine 74 then ends thereby advancing the routine 56 to the item substitution subroutine 80 (see FIG. 5). It should be appreciated that although the user is not required to place the item in the post-scan area 17 in step 112, the self-service checkout terminal 10 may be alternatively configured such that the user is required to do so. For example, the checkout procedure may be suspended after step 108 until the user places the re-weighed item in the post-scan area 17. Such a configuration may be useful for verifying that the user re-weighed the item properly with product scale 12.

In step 114, the processing unit 26 replaces the record of the item placed in the post-scan area 17 in step 112 in the transaction level weight database. In particular, the processing unit 26 communicates with the post-scan shelf scale 20 or the bagwell scale 22 to determine the weight of the item placed in the post-scan area 17 in step 112. Thereafter, the processing unit 26 updates the transaction level weight database. More specifically, the processing unit 26 generates an output signal which is sent to the memory device 27 which causes the transaction level weight database to be updated in the memory device 27 to contain a record that includes (1) the product identification code, and (2) the weight associated with the item that was placed in the post-scan area 17 in step 112. In addition, the processing unit 26 generates an output signal which is sent to the memory device 27 which causes the previous record associated with the re-weighed item to be erased or otherwise removed from the transaction level weight database. The subroutine 74 then returns to step 78 to verify the weight of the re-weighed item.

Returning now to step 104, if (1) the item is not re-weighed with the product scale 12, or (2) the product lookup code associated with the item is not re-entered either via the data input device 34 or the display monitor 32, the subroutine 74 advances to step 110. In step 110, the processing unit 26 causes a message to be displayed on the display monitor 32 which re-instructs the user to re-weigh the item with the product scale 12. The subroutine 74 then loops back to step 104.

Returning now to step 100, if the weight value of the item that is removed from the post-scan area 17 (as detected in step 98) does not match the weight value of the item that was placed in the post-scan area 17 (as detected in step 68), the subroutine 74 advances to step 106. In step 106, the processing unit 26 causes a message to be displayed on the display monitor 32 which instructs the user that the wrong item was removed from the post-scan area 17. The subroutine 74 then advances to step 116.

In step 116, the processing unit 26 increments this event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 74 then loops back to step 98 to monitor removal of a subsequent item.

Returning now to step 98, if the user does not remove the item from the post-scan area 17 within a predetermined period of time, the subroutine 74 advances to step 102. In step 102, the processing unit 26 causes a message to be displayed on the display monitor 32 which re-instructs the user to remove the item from the post-scan area 17, and thereafter re-weigh the item. The subroutine 74 then loops back to step 98 to monitor removal of the item.

As alluded to above, if subsequent to steps 76, 78, or 112 the subroutine 74 ends, the routine 56 is advanced to step 82 of the item substitution subroutine 80 as shown in FIG. 7. In step 82, the processing unit 26 determines if the product identification code corresponding to the record added to the transaction level weight database in step 70 (see FIG. 5) or step 108 (see FIG. 6) is the same as the product identification code corresponding to any previously entered records in the transaction level weight database. In particular to step 82, the processing unit 26 communicates with the memory device 27 to determine if the item that was weighed in step 66 (see FIG. 5) or step 104 (see FIG. 6) has the same (i.e. an identical alphanumeric code) product identification code associated therewith as an item (or items) that was previously entered into the transaction level weight database. As discussed above, items which are sold by weight (e.g. produce, meat, and bulk food items) typically have the weight thereof encoded in the product identification code. Hence, a first bunch of bananas weighing one pound will have a different product identification code associated therewith than will a second group of bananas weighing two pounds thereby enabling the processing unit 26 to distinguish between the two groups when a respective record corresponding to the two groups is added to transaction level weight database. Therefore, if the item weighed in steps 66 or 104 has the same product identification code as an item that was previously entered into the transaction level weight database, the subroutine 80 advances to step 84. If the item weighed in step 66 or 104 does not have the same product identification code as an item that was previously entered into the transaction level weight database, a valid-entry control signal is generated, and the subroutine 80 then ends thereby advancing the routine 56 to step 72 (see FIG. 5).

In step 84, the processing unit 26 determines if the stored weight values of the two (or more) items having the same product identification codes (i.e. the item was weighed in steps 66 or 104 and the item that was previously entered in the transaction level weight database having the same product identification code) match one another. In particular, in step 84, the processing unit 26 communicates with the memory device 27 to retrieve from the transaction level weight database (1) the stored weight value associated with the item that was weighed in steps 66 or 104, and (2) the stored weight value associated with the item previously entered into the transaction level weight database having the same product identification code as the weighed item. Further in step 84, the processing unit 26 compares the two retrieved weight values so as to determine if the weight value associated with the item that was weighed in steps 66 or 104 matches the weight value associated with the item previously entered into the transaction level weight database having the same product identification code. If the weight value associated with the item that was weighed in steps 66 or 104 matches the weight value associated with the item previously entered into the transaction level weight database having the same product identification code, a valid-entry control signal is generated, and the subroutine 80 then ends thereby advancing the routine 56 to step 72 (see FIG. 5). If the weight value associated with the item that was weighed in steps 66 or 104 does not match the weight value associated with the item previously entered into the transaction level weight database having the same product identification code, the subroutine advances to step 86.

In step 86, the processing unit 26 determines that an item substitution has occurred. More specifically, the processing unit 26 concludes that the user apparently entered the same item twice, but placed two different items in the post-scan area 17 because although two records in the transaction level weight database have the same product identification codes associated therewith, the two records do not have matching weight values associated therewith. Hence, the user apparently (1) entered a first item and then placed a second item in the post-scan area 17, and (2) thereafter re-entered the first item and then placed the first item in the post-scan area 17. The subroutine 80 then advances to step 88.

In step 88, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 80 then ends thereby advancing the routine 56 to step 72 (see FIG. 5).

As alluded to above, if subsequent to steps 82, 84, or 88 the subroutine 80 ends, the routine 56 is advanced to step 72 as shown in FIG. 5. In step 72, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 66, if an item is not entered via the product scale 12, the routine 56 advances to step 92. In step 92, the processing unit 26 scans or reads the data communication line 49 to determine whether the user has entered a product identification code associated with an item via the data input device 34. More specifically, the data input device 34 generates an output signal which is sent to the processing unit 26 once the user successfully enters the product identification code associated with an item. If the product identification code is successfully entered via the data input device 34, an item-entered control signal is generated and the routine 56 advances to step 118. If the product identification code is not successfully entered via the data input device 34, the routine 56 advances to step 120.

In step 118, the processing unit 26 adds a record of the item entered in step 92 to the transaction table. In particular, the processing unit 26 communicates with the network 25 to obtain product information (e.g. description and price) associated with the manually entered item. Thereafter, the processing unit 26 updates the transaction table. More specifically, the processing unit 26 generates an output signal which is sent to the memory device 27 which causes the transaction table to be updated in the memory device 27 to include the product information associated with the manually entered item. A valid-use control signal is then generated, and the routine 56 then advances to step 68.

As discussed above, in step 68, the processing unit 26 determines if the manually entered item is placed into the post-scan area 17 of the self-service checkout terminal 10. More specifically, the bagwell scale 22 generates an output signal which is sent to the processing unit 26 once the bagwell scale 22 has detected the user placing the manually entered item into one of the grocery bags 40. As alluded to above, the user may opt not to immediately place the manually entered item into one of the grocery bags (e.g. if the user manually entered a loaf of bread, the user may wait to place the bread into one of the grocery bags 40 until it is nearly full thereby preventing the bread from being crushed). Hence, in step 68 the post-scan shelf scale 20 generates an output signal which is sent to the processing unit 26 once the post-scan shelf scale 20 has detected a user placing the manually entered item onto the post-scan shelf 42a. In addition, the user may opt not to place the manually entered item into the post-scan area 17 at all (e.g. the user places a manually entered pack of gum in his or her pocket). Therefore, in step 68, if the user places the manually entered item into the post-scan area 17 (i.e. into one of the grocery bags 40 or onto the post-scan shelf 42b), a detection control signal is generated and the routine 56 advances to step 70. If the user does not place the manually entered item into the post-scan area 17, the routine 56 advances to step 72.

In step 70, the processing unit 26 adds a record of the item placed in the post-scan area 17 in step 68 to the transaction level weight database. In particular, the processing unit 26 communicates with the post-scan shelf scale 20 or the bagwell scale 22 to determine the weight of the item placed in the post-scan area 17 in step 68. Thereafter, the processing unit 26 updates the transaction level weight database. More specifically, the processing unit 26 generates an output signal which is sent to the memory device 27 which causes the transaction level weight database to be updated in the memory device 27 to contain a record that includes (1) the product identification code, and (2) the weight associated with the item that was placed in the post-scan area 17 in step 68. The routine 56 then advances to the product scale verification subroutine 74 (see FIG. 6).

After completion of step 70 of the routine 56, the subroutine 74 advances to step 76, as shown in FIG. 6. In step 76, the processing unit 26 determines if the item that was placed in the post-scan area 17 in step 68 had been previously weighed with the product scale 12. In particular, the processing unit 26 communicates with the memory device 27 to determine if the record in the transaction table corresponding to the item that was placed in post-scan area 17 includes a measured weight value which was determined by the product scale 12. If the item placed in the post-scan area 17 in step 68 was previously weighed by the product scale 12, the subroutine 74 advances to step 78. If the item placed in the postscan area 17 in step 68 was not previously weighed by the product scale 12, the subroutine 74 then ends thereby advancing the routine 56 to the item substitution subroutine 80 (see FIG. 5).

Since in the present discussion the item placed in the post-scan area 17 in step 68 was entered into the self-service checkout terminal 10 via use of the data input device 34, additional discussion of the product scale verification subroutine 74 is not warranted.

After completion of the product scale verification subroutine 74 (see FIG. 5), the routine 56 is advanced to step 82 of the item substitution subroutine 80. In step 82, the processing unit 26 determines if the product identification code corresponding to the record added to the transaction level weight database in step 70 (see FIG. 5) is the same as the product identification code corresponding to any previously entered records in the transaction level weight database. In particular to step 82, the processing unit 26 communicates with the memory device 27 to determine if the item that was manually entered in step 32 (see FIG. 5) has the same (i.e. an identical alphanumeric code) product identification code associated therewith as an item (or items) that was previously entered into the transaction level weight database. If the manually entered item has the same product identification code as an item that was previously entered into the transaction level weight database, the subroutine 80 advances to step 84. If the manually entered item does not have the same product identification code as an item that was previously entered into the transaction level weight database, a valid-entry control signal is generated, and the subroutine 80 then ends thereby advancing the routine 56 to step 72 (see FIG. 5).

In step 84, the processing unit 26 determines if the stored weight values of the two (or more) items having the same product identification codes (i.e. the item was manually entered in step 92 and the item that was previously entered in the transaction level weight database having the same product identification code) match one another. Hence, in step 84, the processing unit 26 communicates with the memory device 27 to retrieve from the transaction level weight database (1) the stored weight value associated with the item that was manually entered in step 92, and (2) the stored weight value associated with the item previously entered into the transaction level weight database having the same product identification code as the manually entered item. Further in step 84, the processing unit 26 compares the two retrieved weight venues so as to determine if the weight value associated with the item that was manually entered in step 92 matches the weight value associated with the item previously entered into the transaction level weight database having the same product identification code as the manually entered item. If the weight value associated with the item that was manually entered in step 92 matches the weight value associated with the item previously entered into the transaction level weight database having the same product identification code as the manually entered item, a valid-entry control signal is generated and the subroutine 80 then ends thereby advancing the routine 56 to step 72 (see FIG. 5). If the weight value associated with the item that was manually entered in step 92 does not match the weight value associated with the item previously entered into the transaction level weight database having the same product identification code as the manually entered item, the subroutine advances to step 86.

In step 86, the processing unit 26 determines that an item substitution has occurred. More specifically, the processing unit 26 concludes that the user apparently entered the same item twice, but placed two different items in the post-scan area 17 because although two records in the transaction level weight database have the same product identification codes associated therewith, the two records do not have matching weight values associated therewith. Hence, the user apparently (1) entered a first item and then placed a second item in the post-scan area 17, and (2) thereafter re-entered the first item and then placed the first item in the post-scan area 17. The subroutine 80 advances to step 88.

In step 88, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 80 then ends thereby advancing the routine 56 to step 72 (see FIG. 5).

As alluded to above, if subsequent to steps 82, 84, or 88 the subroutine 80 ends, the routine 56 is advanced to step 72 as shown in FIG. 5. In step 72, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 92, if the user does not manually enter a product identification code associated with an item via the data input device 34, the routine 56 advances to step 120. In step 120, the processing unit 26 determines if the user has voided entry of an item. In particular, the processing unit 26 scans or reads the data communication lines 29 and 49 to determine if the user has voided an item via either the scanner 14 or the data input device 34, respectively. If the user voids an item, the routine 56 advances to a voided item subroutine 122. If a user does not void an item, the routine 56 advances to step 124.

Figure 8A:
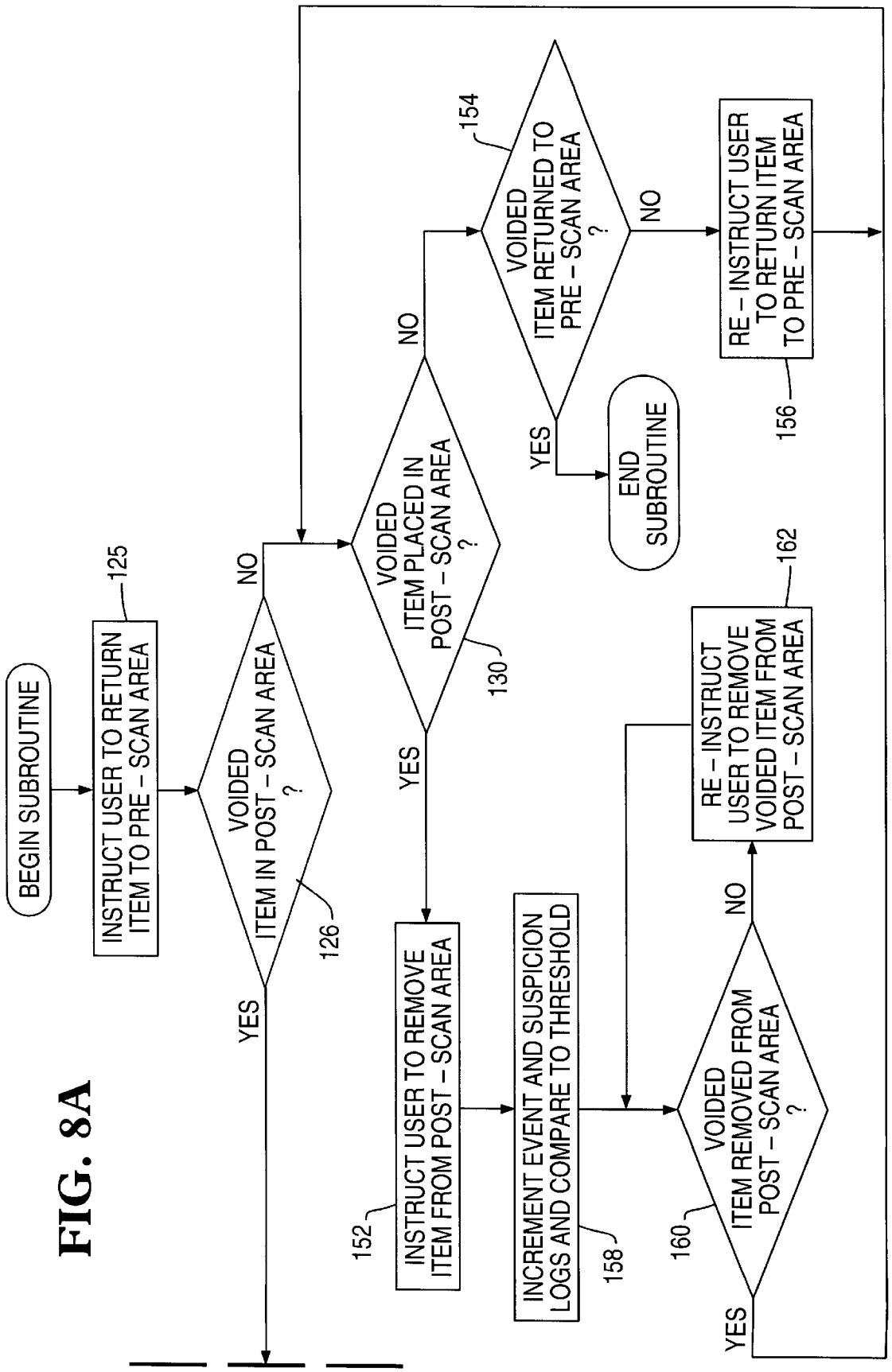
FIGS. 8A–8C is a flowchart setting forth in detail the voided item subroutine 122 of the itemization step of FIG. 5.
Figure 8B:
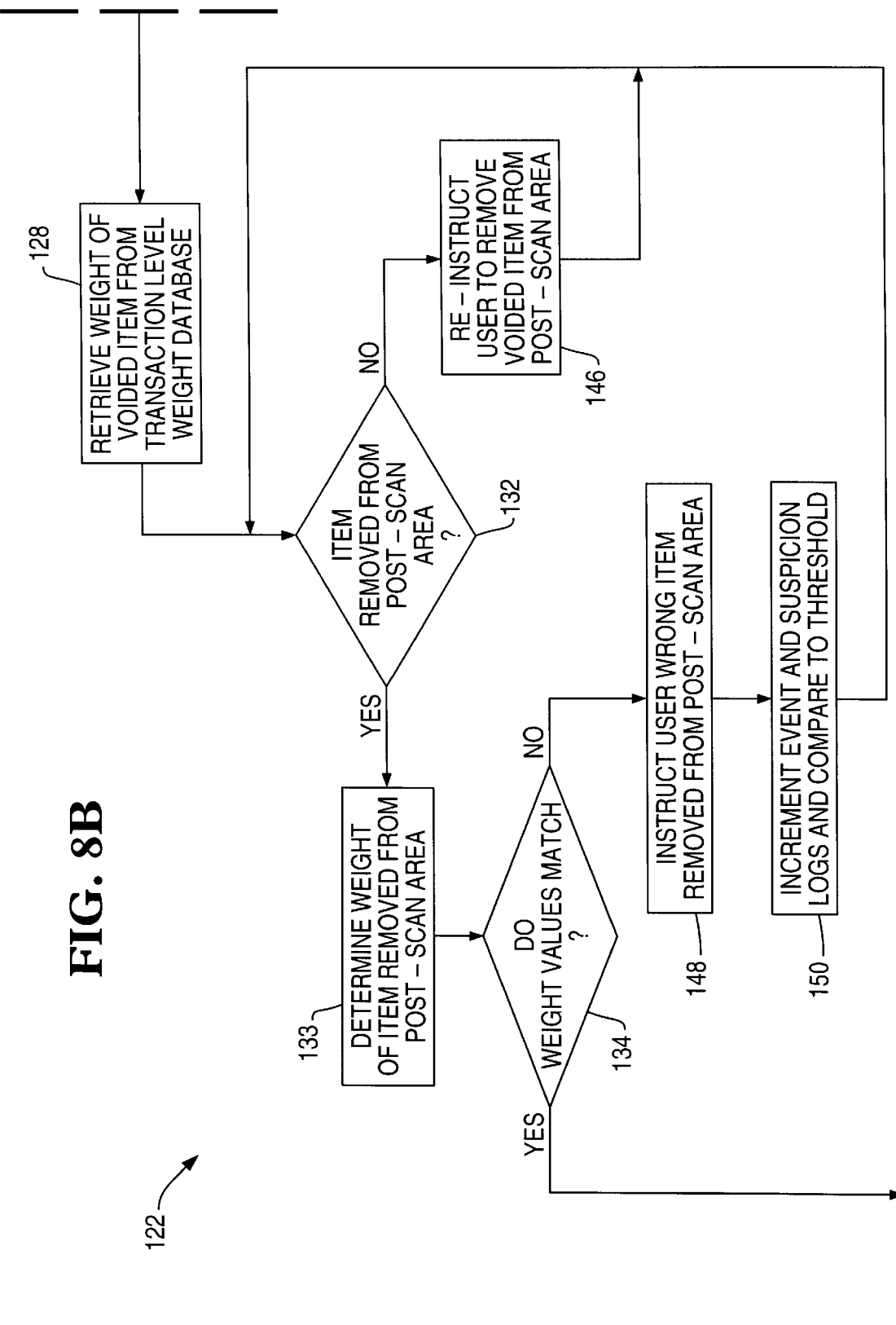
Figure 8C:
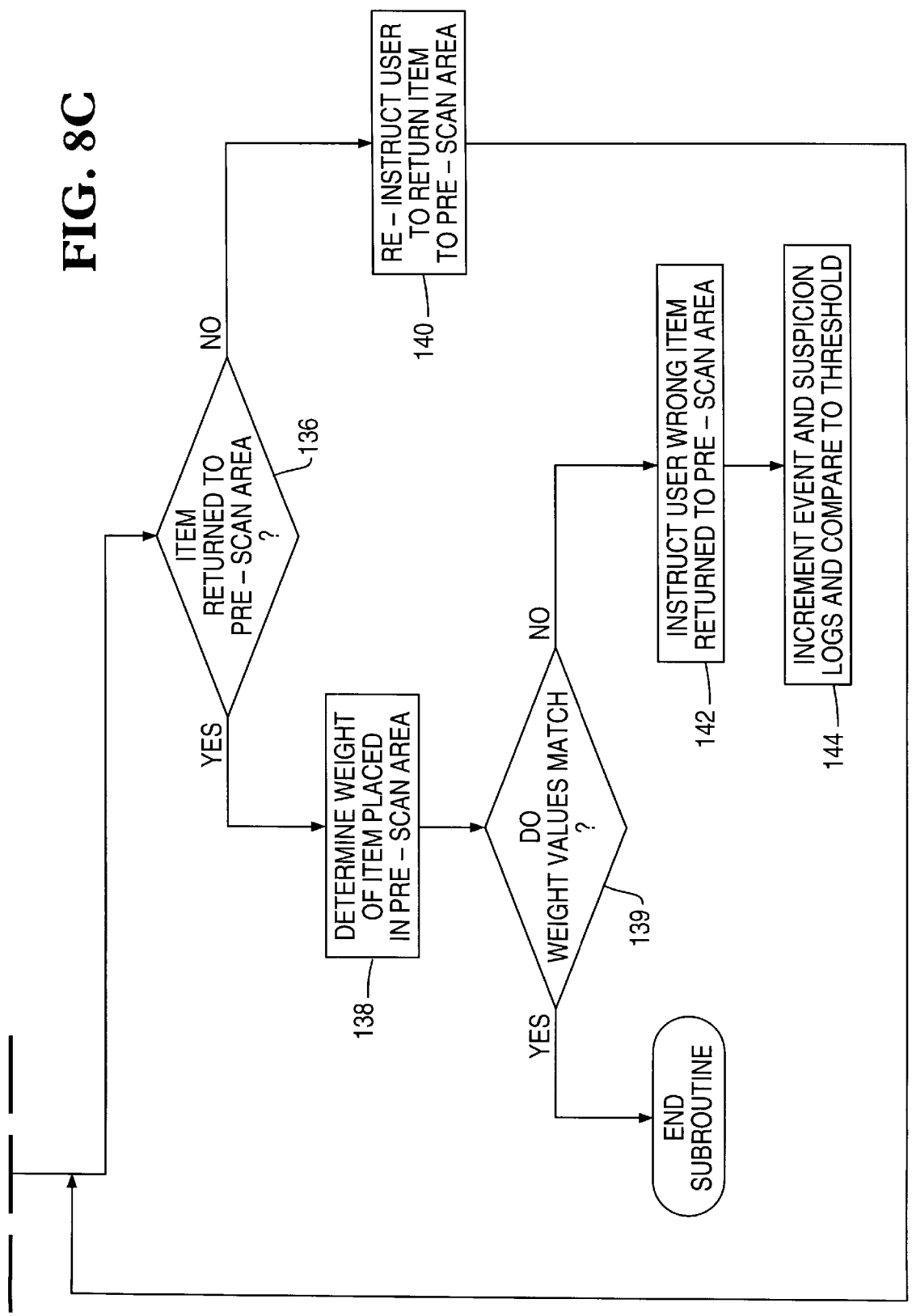

Referring now to FIG. 8, there is shown a flowchart setting forth the voided item subroutine 122 in greater detail. After completion of step 120 (see FIG. 5), the subroutine 122 advances to step 125. In step 125, the processing unit 26 causes a message to be displayed on the display monitor 32 which instructs the user to return the voided or removal item to the pre-scan area 15. In particular, as alluded to above, the pre-scan shelf 42a defines a return area associated with the self-service checkout terminal 10. Hence, in step 125, the processing unit 26 causes a message to be displayed on the display monitor 32 which instructs the user to position the voided item on the pre-scan shelf 42a. The subroutine 122 then advances to step 126.

In step 126, the processing unit 26 determines if the voided item is positioned in the post-scan area 17. In particular, the processing unit communicates with the memory device 27 to determine if a record corresponding to the voided item is included in the transaction level weight database. It should be appreciated that presence of a record corresponding the voided item, along with absence of subsequent removal of the voided item, is indicative that the voided item is positioned in the post-scan area 17. This is true since records corresponding to items are entered into the transaction level weight database as a result of the item being positioned in the post-scan area 17 (i.e. being positioned on the post-scan shelf 42b or being placed into one of the grocery bags 40). If the voided item is positioned in the post-scan area 17, the subroutine 122 advances to step 128. If the voided item is not positioned in the post-scan area 17, the subroutine 122 advances to step 130.

In step 128, the processing unit 26 retrieves a weight value from the transaction level weight database (i.e. an input weight value) associated with the voided item as measured by the post-scan shelf scale 20 or the bagwell scale 22 when the voided item was originally placed in the post-scan area 17. In particular, the processing unit 26 communicates with the memory device 27 in order to retrieve the weight value associated with the voided item from the number of weight values stored in the transaction level weight database. The subroutine 122 then advances to step 132.

In step 132, the processing unit 26 determines if the user removed the voided item from the post-scan area 17. In particular, the post-scan shelf scale 20 or the bagwell scale 22 generates an output signal which is sent to the processing unit 26 if the user removes the voided item from either the post-scan shelf 42b or from one of the grocery bags 40, respectively. If the user removes the voided item from the post-scan area 17, the subroutine 122 advances to step 133. If the user does not remove the voided item from the post-scan area 17, the subroutine 122 advances to step 146.

In step 133, the processing unit 26 determines a weight value (i.e. a removal weight value) of the item removed from the post-scan area 17. In particular, the processing unit 26 communicates with the post-scan shelf scale 20 and the bagwell scale 22 to determine the weight value of the item removed therefrom in step 132. The subroutine 122 then advances to step 134.

In step 134, the processing unit 26 compares the weight value of the item removed from the post-scan area 17 with the weight value of the voided item prior to the voiding thereof. In particular, the processing unit 26 compares the weight value of the item as measured by the post-scan shelf scale 20 or the bagwell scale 22 in step 133 to the weight value of the item as retrieved from the transaction level weight database in step 128. If the weight value of the item as measured by the post-scan shelf scale 20 or the bagwell scale 22 in step 133 matches the weight value of the item as retrieved from the transaction level weight database in step 128, the processing unit 26 concludes that the proper item (i.e. the item that was voided in step 120) was removed from the post-scan area 17, and therefore generates a correct-item-removed control signal thereby advancing the subroutine 122 to step 136. If the weight value of the item as measured by the post-scan shelf scale 20 or the bagwell scale 22 in step 133 does not match the weight value of the item as retrieved from the transaction level weight database in step 128, the processing unit 26 concludes that the user removed a different item from the post-scan area 17 than was voided in step 120, and therefore generates a wrong-item-removed control signal thereby advancing the subroutine 122 to step 148.

In step 136, the processing unit 26 determines if the user returned the voided item to the pre-scan area 15 as instructed in step 125. In particular, the pre-scan shelf scale 16 generates an output signal which is sent to the processing unit 26 once the pre-scan shelf scale 16 has detected the user positioning the voided item on the pre-scan shelf 42a. If the user returns an item to the pre-scan area 15, the subroutine 122 advances to step 138. If the user does not return an item to the pre-scan area 15 within a predetermined period of time, the subroutine 122 advances to step 140.

It should be appreciated that although in step 136, the processing unit 26 determines if the user returned the voided item to the pre-scan area 15 and has significant advantages thereby, certain advantages of the present invention may be achieved by other configurations of the subroutine 122. For example, the subroutine 122 could end upon successful completion of step 134 at which time the user would be instructed to return the item to the pre-scan area 15, but the self-service checkout terminal 10 would not monitor compliance therewith. Alternatively, or in addition to, upon successful completion of step 134, the subroutine 122 may end and thereafter return to step 62 of the routine 56 so as to monitor entry of the voided item into the self-service checkout terminal 10.

In step 138, the processing unit 26 determines the weight of the item placed in the pre-scan area 15. In particular, the processing unit 26 communicates with the pre-scan shelf scale 16 to determine the weight value (i.e. a return weight value) of the item placed thereon in step 136.

The subroutine 122 then advances to step 139.

In step 139, the processing unit 26 compares the weight value of the item placed in the pre-scan area 15 with the weight value of the item removed from the post-scan area 17. In particular, the processing unit 26 compares the weight value of the item as measured by the pre-scan shelf scale 16 in step 138 to the weight value of the item as measured by the post-scan shelf scale 20 or the bagwell scale 22 in step 133. If the weight value of the item as measured by the pre-scan shelf scale 16 in step 138 matches the weight value of the item as measured by the post-scan shelf scale 20 or the bagwell scale 22 in step 133, the processing unit 26 concludes that the proper item (i.e. the item that was voided in step 120) was returned to the pre-scan area 15, and therefore generates a correct-item-returned control signal which causes the subroutine 122 to end thereby advancing the routine 56 to step 72 (see FIG. 5). If the weight value of the item as measured by the pre-scan shelf scale 16 in step 138 does not match the weight value of the item as measured by the postscan shelf scale 20 or the bagwell scale 22 in step 133, the processing unit 26 concludes that the user returned a different item to the pre-scan area 15 than was voided in step 120, and therefore generates a wrong-item-returned control signal thereby advancing the subroutine 122 to step 142.

In step 142, the processing unit 26 causes a message to be displayed on the display monitor 32 which instructs the user that the wrong item was returned to the pre-scan area 15. The subroutine 122 then advances to step 144.

In step 144, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 122 then loops back to step 136 to monitor the return of a subsequent item to the pre-scan area 15.

Returning now to step 136, if the user does not return the voided item to the pre-scan area 15 within a predetermined period of time, the subroutine advances to step 140. In step 140, the processing unit 26 causes a message to be displayed on the display monitor 32 which re-instructs the user to return the voided item to the pre-scan area 15. The subroutine 122 then loops back to step 136 to monitor the return of the voided item to the pre-scan area 15.

Returning now to step 134, if the weight value of the item as measured by the post-scan shelf scale 20 or the bagwell scale 22 in step 133 does not match the weight value of the item as retrieved from the transaction level weight database in step 128, the processing unit 26 concludes that the user removed a different item from the post-scan area 17 than was voided in step 120, and therefore the subroutine 122 advances to step 148. In step 148, the processing unit 26 causes a message to be displayed on the display monitor 32 which instructs the user that the wrong item was removed from the post-scan area 17. The subroutine 122 then advances to step 150.

In step 150, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds ts predetermined threshold value, the processing unit 26 causes a personnel control signal to be sent to the network 25 which in turn pages or otherwise summons the retailer's personnel such as security personnel to audit or otherwise investigate the user's transaction. The subroutine 122 then loops back to step 132 to monitor removal of a subsequent item from the post-scan area 17. It should be appreciated that the subroutine 122 may also be configured with a step (not shown) in which the self-service checkout terminal 10 monitors or otherwise allows replacement of the wrong item back into the post-scan area 17.

While the above use of the event log and suspicion log in step 150 has numerous advantages associated therewith, certain of these advantages may be achieved with other monitoring configurations. For example, the self-service checkout terminal 10 may be configured to page or otherwise summon security personnel upon every occurrence of the wrong item being removed from the post-scan area 17 irrespective of the value of the event or suspicion logs. Moreover, the memory device 27 may be configured to include a separate log dedicated entirely to tracking the occurrences of the wrong item being removed from the post-scan area 17. It should be appreciated that in the case of where such a separate log is maintained, a unique threshold value for such a log may be established. Such a unique threshold value may be constant (i.e. the magnitude of the threshold value remains the same despite the level of usage associated with the self-service checkout terminal 10), or may be variable (i.e. the magnitude of the threshold value may be reduced during periods of relatively high usage so as to increase the throughput associated with the self-service checkout terminal 10, or may alternatively be increased during periods of low usage so as to increase the security associated with the self-service checkout terminal 10).

Returning now to step 132, if the user does not remove the voided item from the post-scan area 17 within a predetermined period of time, the subroutine 122 advances to step 146. In step 146, the processing unit 26 causes a message to be displayed on the display monitor 32 which re-instructs the user to remove the voided item from the post-scan area 17 and thereafter return the voided item to the pre-scan area 15. The subroutine 122 then loops back to step 132 to monitor removal of a subsequent item from the post-scan area 17.

Returning now to step 126, if the voided item is not positioned in the post-scan area 17, the subroutine 122 advances to step 130. In step 130, the processing unit 26 determines if the user places the voided item in the post-scan area 17 subsequent to voiding the item. More specifically, the post-scan shelf scale 20 or the bagwell scale 22 generates an output signal which is sent to the processing unit 26 if the user places the voided item on either the post-scan shelf 42b or into one of the grocery bags 40, respectively. If the user places the voided item in the post-scan area 17 subsequent to voiding the same, the subroutine 122 advances to step 152. If the user does not place the item in the post-scan area 17 subsequent to voiding the same, the subroutine 122 advances to step 154.

In step 154, the processing unit 26 determines if the user returned the voided item the pre-scan area 15 as instructed in step 125. In particular, the pre-scan shelf scale 16 generates an output signal which is sent to the processing unit 26 once the pre-scan shelf scale 16 has detected the user positioning the voided item on the pre-scan shelf 42a. If the user returns the voided item to the pre-scan area 15, the subroutine 122 then ends thereby advancing the routine 56 to step 72 (see FIG. 5).

If the user does not return the voided item to the pre-scan area 15 within a predetermined period of time, the subroutine advances to step 156.

It should be appreciated that although in step 154, the processing unit 26 determines if the user returned the voided item to the pre-scan area 15 and has significant advantages thereby, certain advantages of the present invention may be achieved by other configurations of the subroutine 122. For example, the subroutine 122 could end upon a determination in step 130 that the voided item was not placed in the post-scan area 17 at which time the user would be instructed to return the voided item to the pre-scan area 15, but the self-service checkout terminal 10 would not monitor compliance therewith. Alternatively, or in addition to, upon a determination in step 130 that the voided item was not placed in the post-scan area 17, the subroutine 122 may end and thereafter return to step 62 of the routine 56 so as to monitor entry of the voided item into the self-service checkout terminal 10.

In step 156, the processing unit 26 causes a message to be displayed on the display monitor 32 which re-instructs the user to return the voided item to the pre-scan area 15. The subroutine 122 then loops back to step 154 to monitor the return of the voided item to the pre-scan area 15.

Returning now to step 130, if the user places the voided item in the post-scan area 17 subsequent to voiding the same, the subroutine 122 advances to step 152. In step 152, the processing unit 26 causes a message to be displayed on the display monitor 32 which instructs the user to remove the voided item from the post-scan area 17 and thereafter return the voided item to the pre-scan area 15. The subroutine 122 then advances to step 158.

In step 158, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 122 then advances to step 160.

In step 160, the processing unit 26 determines if the user removed the voided item from the post-scan area 17 as instructed in step 152. In particular, the post-scan shelf scale 20 or the bagwell scale 22 generates an output signal indicative of the measured weight of the item which is sent to the processing unit 26 once the post-scan shelf scale 20 or the bagwell scale 22 detects the voided item being removed from either the post-scan shelf 42b or one of the grocery bags 40, respectively. If the user removes the voided item from the post-scan area 17, the subroutine 122 advances to step 154 to monitor return of the voided item to the pre-scan area 15 as described above. If the user does not remove the voided item from the post-scan area 17 within a predetermined period of time, the subroutine 122 advances to step 162.

In step 162, the processing unit 26 causes a message to be displayed on the display monitor 32 which re-instructs the user to remove the voided item from the post-scan area 17, and thereafter return the voided item to the pre-scan area 15. The subroutine 122 then loops back to step 160 to monitor removal of the item.

As alluded to above, if subsequent to steps 139 or 154 the subroutine 122 ends, the routine 56 is advanced to step 72 as shown in FIG. 5. In step 72, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 120 (see FIG. 5), if a user does not void entry of an item, the routine 56 advances to step 124. In step 124, the processing unit 26 determines if the user places the an item in the post-scan area 17 without having first entered (i.e. scanned, weighed, or manually entered) the item. In particular, the post-scan shelf scale 20 or the bagwell scale 22 generates an output signal which is sent to the processing unit 26 if the user places an item that has not been entered on either the post-scan shelf 42b or into one of the grocery bags 40, respectively. If the user places an item that has not been entered in the post-scan area 17, an invalid-use control signal is generated and the routine 56 advances to step 164. If the user does not place an item in the post-scan area 17, the routine 56 advances to step 166.

In step 164, the processing unit 26 determines the weight of the item placed in the post-scan area 17. In particular, the processing unit 26 communicates with the post-scan shelf scale 20 or the bagwell scale 22 to determine the weight value of the item placed in the post-scan area 17. The routine 56 then advances to step 168.

In step 168, the processing unit 26 causes a message to be displayed on the display monitor 32 which instructs the user to remove the item from the post-scan area 17 and thereafter return the item to the pre-scan area 15. The routine 56 then advances to step 170.

In step 170, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The routine 56 then advances to an item removal subroutine 172.

Figure 9A:
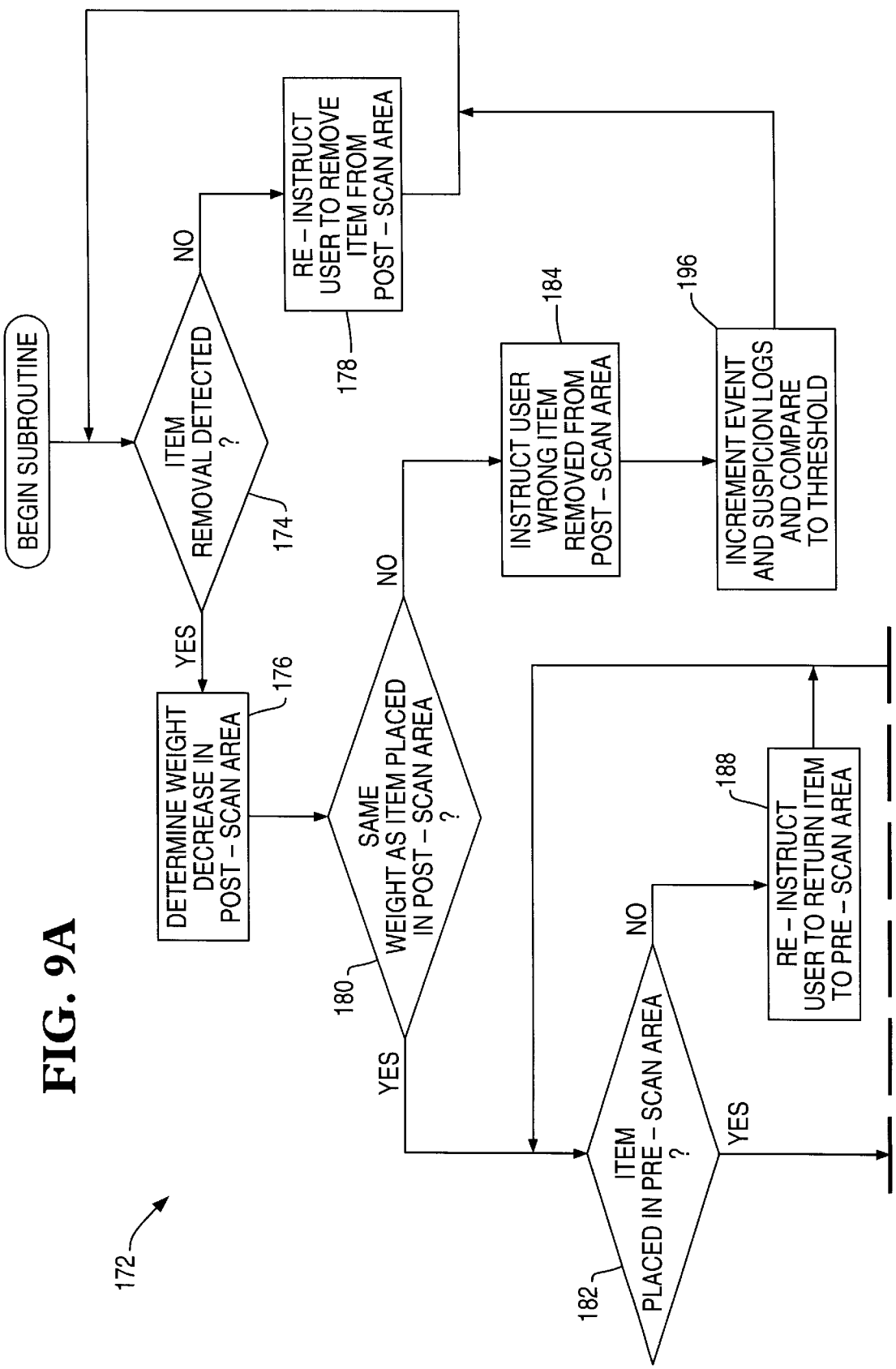
FIGS. 9A–9B is a flowchart setting forth in detail the item removal subroutine 172 of the general procedure of FIG. 5.
Figure 9B:
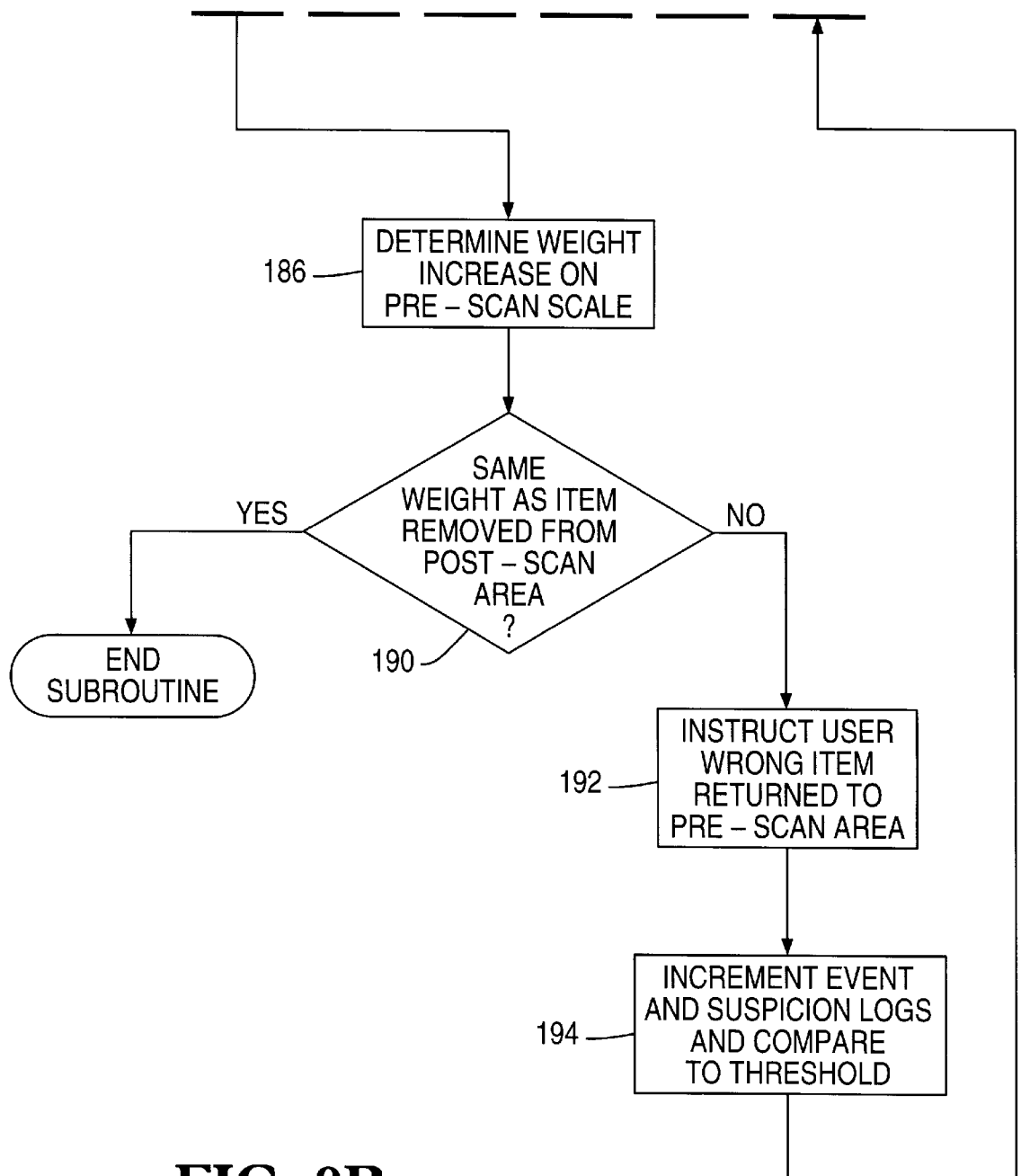

Referring now to FIG. 9, there is shown a flowchart setting forth the item removal subroutine 172 in greater detail. After completion of step 170 (see FIG. 5), the subroutine 172 advances to step 174. In step 174, the processing unit 26 determines if the user removed the item from the post-scan area 17 as instructed. In particular, the post-scan shelf scale 20 or the bagwell scale 22 generates an output signal which is sent to the processing unit 26 once the post-scan shelf scale 20 or the bagwell scale 22 detects the item being removed from either the post-scan shelf 42b or one of the grocery bags 40, respectively. If the user removes the item from the post-scan area 17, the subroutine 172 advances to step 176. If the user does not remove the item from the post-scan area 17 within a predetermined period of time, the subroutine 172 advances to step 178.

In step 176, the processing unit 26 determines the weight of the item removed from the post-scan area 17. In particular, the processing unit 26 communicates with the post-scan shelf scale 20 or the bagwell scale 22 to determine the weight value of the item removed from the post-scan area 17. The subroutine 172 then advances to step 180.

In step 180, the processing unit 26 compares the weight value of the item placed in the post-scan area 17 (as detected in step 164 of FIG. 5) with the weight value of the item removed from the post-scan area 17 (as detected in step 176). If the weight value of the item placed in the post-scan area 17 matches the weight value of the item removed from the post-scan area 17, the processing unit 26 concludes that the proper item (i.e. the item that was placed in the post-scan area 17 in step 124) was removed from the post-scan area 17, and therefore the subroutine 172 advances to step 182. If the weight value of the item placed in the post-scan area 17 does not match the weight value of the item removed from the post-scan area 17, the processing unit 26 concludes that the user removed a different item from the post-scan area 17, and therefore the subroutine 172 advances to step 184.

In step 182, the processing unit 26 determines if the user returned the item the pre-scan area 15 as instructed in step 168 (see FIG. 5). In particular, the pre-scan shelf scale 16 generates an output signal which is sent to the processing unit 26 once the pre-scan shelf scale 16 has detected the user positioning the item on the pre-scan shelf 42a. If the user returns the item to the pre-scan area 15, the subroutine 172 advances to step 186. If the user does not return the item to the pre-scan area 15 within a predetermined period of time, the subroutine 172 advances to step 188.

It should be appreciated that although in step 182, the processing unit 26 determines if the user returned the item to the pre-scan area 15 and has significant advantages thereby, certain advantages of the present invention may be achieved by other configurations of the subroutine 172. For example, the subroutine 172 could end upon successful completion of step 180 at which time the user would be instructed to return the item to the pre-scan area 15, but the self-service checkout terminal 10 would not monitor compliance therewith. Alternatively, or in addition to, upon successful completion of step 180, the subroutine 172 may end and thereafter return to step 62 of the routine 56 so as to monitor entry of the item into the self-service checkout terminal 10.

In step 186, the processing unit 26 determines the weight of the item placed in the pre-scan area 15. In particular, the processing unit 26 communicates with the pre-scan shelf scale 16 to determine the weight value of the item placed thereon in step 182. The subroutine 172 then advances to step 190.

In step 190, the processing unit 26 compares the weight value of the item placed in the pre-scan area 15 with the weight value of the item removed from the post-scan area 17. In particular, the processing unit 26 compares the weight value of the item as measured by the pre-scan shelf scale 16 in step 186 to the weight value of the item as measured by the post-scan shelf scale 20 or the bagwell scale 22 in step 176. If the weight value of the item as measured by the pre-scan shelf scale 16 in step 186 matches the weight value of the item as measured by the post-scan shelf scale 20 or the bagwell scale 22 in step 176, the processing unit 26 concludes that the proper item (i.e. the item that was removed from the post-scan area 17 in step 174) was returned to the pre-scan area 15, and therefore the subroutine 172 ends thereby advancing the routine 56 to step 72 (see FIG. 5). If the weight value of the item as measured by the pre-scan shelf scale 16 in step 186 does not match the weight value of the item as measured by the post-scan shelf scale 20 or the bagwell scale 22 in step 176, the processing unit 26 concludes that the user returned a different item to the pre-scan area 15 than was removed from the post-scan area 17 in step 174, and therefore the subroutine 172 advances to step 192.

In step 192, the processing unit 26 causes a message to be displayed on the display monitor 32 which instructs the user that the wrong item was returned to the pre-scan area 15. The subroutine 172 then advances to step 194.

In step 194, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 172 then loops back to step 182 to monitor the return of a subsequent item to the pre-scan area 15.

Returning now to step 182, if the user does not return the item to the pre-scan area 15 within a predetermined period of time, the subroutine 172 advances to step 188. In step 188, the processing unit 26 causes a message to be displayed on the display monitor 32 which re-instructs the user to return the item to the pre-scan area 15. The subroutine 172 then loops back to step 182 to monitor the return of the item to the pre-scan area 15.

Returning now to step 180, if the weight value of the item placed in the post-scan area 17 does not match the weight value of the item removed from the post-scan area 17, the processing unit 26 concludes that the user removed a different item from the post-scan area 17, and therefore the subroutine 172 advances to step 184. In step 184, the processing unit 26 causes a message to be displayed on the display monitor 32 which instructs the user that the wrong item was removed from the post-scan area 17. The subroutine 172 then advances to step 196.

In step 196, the processing unit 26 increments the event log and the suspicion log by a predetermined value. More specifically, the processing unit 26 generates an output signal which is sent to the memory device 27 which causes the event log and the suspicion log to be incremented in the memory device 27 by a value of one.

Thereafter, the processing unit 26 determines if the total value of either the event log or the suspicion log exceeds the respective predetermined threshold value for each log. More specifically, if the event log exceeds its predetermined threshold value, the processing unit 26 causes a personnel control signal to be sent to the network 25 which in turn pages or otherwise summons the retailer's personnel in order to assist the user. In addition, if the suspicion log exceeds its predetermined threshold value, the processing unit 26 causes a personnel control signal to be sent to the network 25 which in turn pages or otherwise summons the retailer's personnel such as security personnel to audit or otherwise investigate the user's transaction. The subroutine 172 then loops back to step 174 to monitor removal of a subsequent item from the post-scan area 17. It should be appreciated that the subroutine 172 may also be configured with a step (not shown) in which the self-service checkout terminal 10 monitors or otherwise allows replacement of the wrong item back into the post-scan area 17.

Returning now to step 174, if the user does not remove the item from the post-scan area 17 within a predetermined period of time, the subroutine 172 advances to step 178. In step 178, the processing unit 26 causes a message to be displayed on the display monitor 32 which re-instructs the user to remove the item from the post-scan area 17, and thereafter return the item to the pre-scan area 15. The subroutine 172 then loops back to step 174 to monitor removal of the item from the post-scan area 17.

As alluded to above, if subsequent to step 190 the subroutine 172 ends, the routine 56 is advanced to step 72 as shown in FIG. 5. In step 72, the processing unit 26 monitors the communication line 49 from the data input device 34, and the communication line 43 from the display monitor 32 in order to determine whether there are more items to be entered. In particular, a message is displayed on the display monitor 32 instructing the user to touch a particular touch screen area displayed on the display monitor 32, or to touch a particular key associated with the data input device 34, when the user has completed entering all of the items for purchase.

If a particular signal is detected on either of the communication lines 43 or 49, the processing unit 26 determines that the checkout procedure is complete and the routine 56 advances to the finalization step 58 (see FIG. 4). If a signal is not detected on either of the communication lines 43 or 49, the processing unit 26 determines that the user has additional items for purchase, and the routine returns to step 62.

Returning now to step 124, if the user does not place an item in the post-scan area 17, the routine 56 advances to step 166. In step 166, since (1) the scanner 14 did not generate an output signal on the data communication line 29 indicating that an item was entered via the scanner 14, (2) the product scale 12 did not generate an output signal on the data communication line 31 indicating that an item was placed on the product scale 12 for entry thereof, (3) the data input device 34 did not generate an output signal on the data communication line 49 indicating an item was manually entered, (4) the scanner 14 or the data input device 34 did not generate an output signal on the data communication lines 29 or 49, respectively, indicating that an item was voided, and (5) the post-scan shelf scale 20 or the bagwell scale 22 did not generate an output signal on the data communication lines 37 or 39, respectively, indicating that an item was placed in the post-scan area 17, the processing unit 26 concludes that there is no present attempt being made by the user to checkout an item. Thus, the routine 56 advances to step 62 to loop through the routine 56 once again.

Figure 10A:
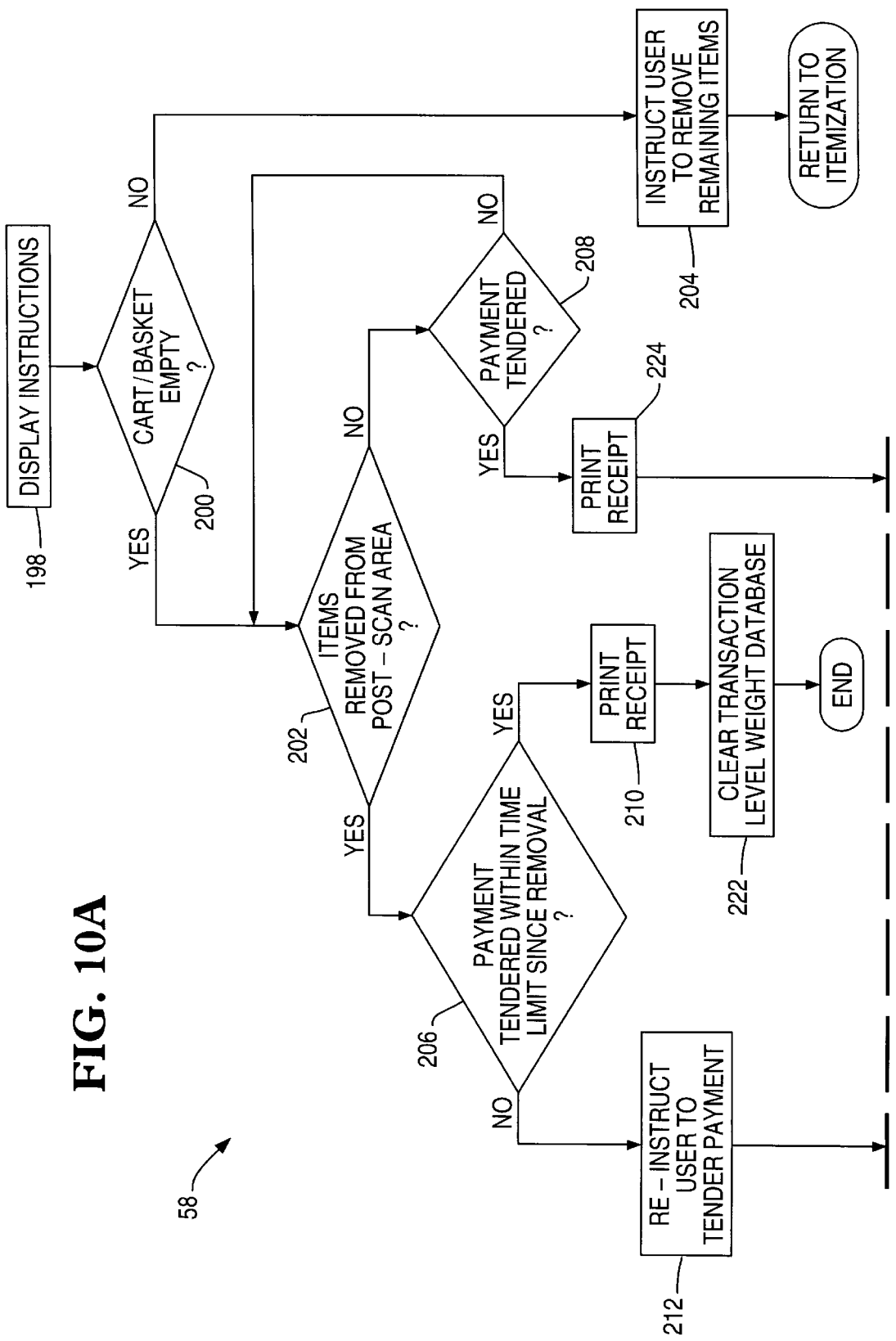
FIGS. 10A–10B is a flowchart setting forth in detail the finalization step 58 of the general procedure of FIG. 4.
Figure 10B:
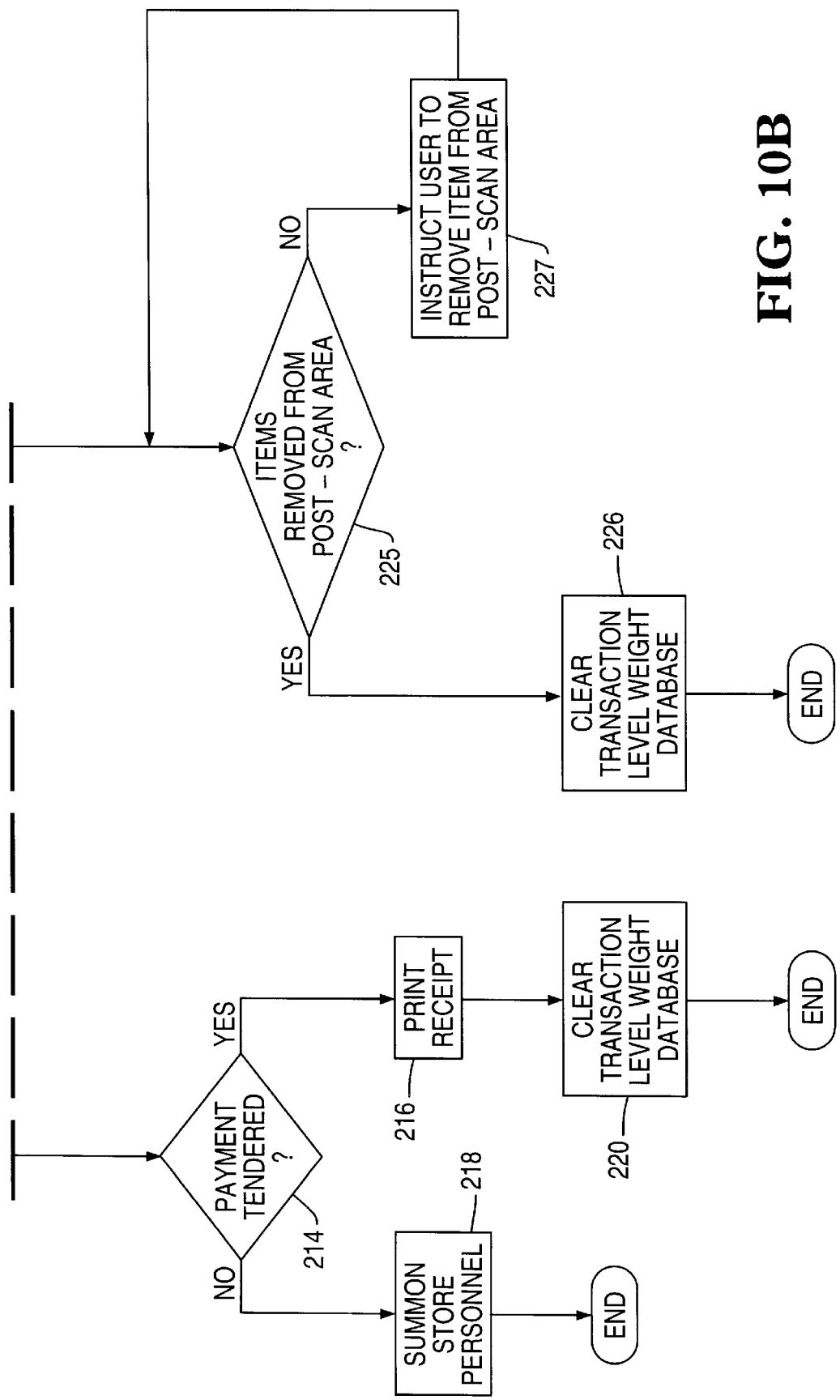

As alluded to above, if subsequent to step 72 the routine 56 ends, the routine 50 is advanced to the finalization step 58 as shown in FIG. 4. Referring now to FIG. 10, there is shown a flowchart setting forth the finalization step 58 in greater detail. After completion of the itemization step 56 (see FIG. 4), the routine 58 advances to step 198. In step 198, the processing unit 26 causes a message to be displayed on the display monitor 32 which instructs the user to (1) verify that all items for purchase have been removed from the user's shopping cart (i.e. the grocery cart 21) or the user's grocery hand basket (i.e. the grocery hand basket 23), and (2) to tender payment by either (i) inserting currency into the cash acceptor (not shown), (ii) charging a cash amount to a credit card with the card reader 30, or (iii) reducing an amount stored on a debit, ATM, or smart card with the card reader 30.

The routine 58 then advances to step 200 where the processing unit 26 determines if the user's shopping cart (i.e. the grocery cart 21) or the user's grocery hand basket (i.e. the grocery hand basket 23) is empty. In particular, the processing unit 26 communicates with the cart/basket scale 18 to determine either (1) the weight of the grocery cart 21 if the grocery cart 21 is positioned on the cart unloading platform 46, and/or (2) the weight of the grocery hand basket 23 if the grocery hand basket 23 is positioned on the basket shelf 44. Thereafter, the processing unit 26 compares the measured weight of the grocery cart 21 or the grocery hand basket 23 to a stored nominal weight value corresponding to an empty grocery cart or an empty grocery hand basket, respectively. If the measured weight of the grocery cart 21 or the grocery hand basket 23 matches the stored nominal weight value corresponding to an empty grocery cart or an empty grocery hand basket, respectively, the processing unit 26 concludes that the grocery cart 21 or the grocery hand basket 23 is empty or otherwise void of additional items. If the user's grocery cart or grocery hand basket is empty, the routine 58 advances to step 202. If the user's grocery cart or grocery hand basket is not empty, the routine 58 advances to step 204.

It should be appreciated that in step 200, the stored weight value corresponding to an empty grocery cart or grocery hand basket may be an average empty weight value of all of the retailer's grocery carts 21 or grocery hand baskets 23, respectively. Alternatively, each of the grocery carts 21 or grocery hand baskets 23 may have a unique empty weight value associated therewith which is retrieved by the processing unit 26 by having the user (1) enter a serial number printed on the (grocery cart 21 or the grocery hand basket 23, or (2) scanning a bar code (which has the serial number encoded therein) printed on the grocery cart 21 or the grocery hand basket 23.

In step 202, the processing unit 26 determines if the user has removed his or her items from the post-scan area 17. In particular, the processing unit 26 communicates with the post-scan shelf scale 20 and the bagwell scale 22 to determine if the user has (1) removed his or her items from the post-scan shelf 42b, or (2) removed his or her grocery bags 40 from the bagwell 38, respectively. If the user has removed his or items from the post-scan area 17, the routine 58 advances to step 206. If the user has not removed his or her items from the post-scan area 17, the routine 58 advances to step 208.

In step 206, the processing unit 26 determines if the user has tendered payment within a predetermined time period since removal of the user's items from the post-scan area 17. In particular, the processing unit 26 scans or reads the data communication line 45 in order to determine if the user has charged a cash amount to a credit card with the card reader 30, or reduced an amount stored on a debit, ATM, or smart card with the card reader 30. In addition, the processing unit 26 communicates with the cash acceptor (not shown) in order to determine if the user has inserted currency into the cash acceptor. If the user tenders payment within the predetermined time period since removal of the user's items from the post-scan area 17, a payment tendered control signal is generated, and the routine 58 advances to step 210. If the user does not tender payment within the predetermined time period since removal of the user's items from the post-scan area 17, the routine 58 advances to step 212.

In step 212, the processing unit 26 causes a message to be displayed on the display monitor 32 which re-instructs the user to tender payment. The routine 58 then advances to step 214.

Step 214 follows the procedure outlined above with regard to step 206. In particular, the processing unit 26 determines if the user has tendered payment. More specifically, the processing unit 26 scans or reads the data communication line 45 in order to determine if the user has charged a cash amount to a credit card with the card reader 30, or reduced an amount stored on a debit, ATM, or smart card with the card reader 30. In addition, the processing unit 26 communicates with the cash acceptor (not shown) in order to determine if the user has inserted currency into the cash acceptor. If the user tenders payment, a payment tendered control signal is generated, and the routine 58 advances to step 216. If the user does not tender payment, the routine 58 advances to step 218.

In step 216, the processing unit 26 determines that the user has properly completed his or her checkout transaction.

Therefore, in step 216 the processing unit 26 causes selective data stored in the transaction table to be printed by the printer 36 thereby generating a receipt for the user. The routine 58 then advances to step 220.

In step 220, the processing unit 26 causes the transaction level weight database to be cleared. In particular, the processing unit 26 communicates with the memory device 27 so as to cause the transaction level weight database stored in the memory device 27 to be cleared or otherwise erased. Hence, when a subsequent user initiates a checkout procedure, the transaction level weight database will be devoid of records. The routine 58 then ends thereby returning the routine 50 to step 52 in which the self-service checkout terminal 10 remains in the idle condition until a subsequent user initiates a checkout procedure.

Returning now to step 214, if the user does not tender payment, the routine 58 advances to step 218. In step 218, the processing unit 26 concludes that the user has removed his or her items from the post-scan area 17, and thereafter left the area proximate the self-service checkout terminal 10 without tendering payment for the items. It should be appreciated that the user may have removed his or her items from the post-scan area 17 without tendering payment in order to commit an impropriety such as theft. Hence, in step 218, the processing unit 26 causes a personnel control signal to be sent to the network 25 which in turn pages or otherwise summons the retailer's security personnel to investigate or otherwise determine if the user has committed an impropriety such as theft. The routine 58 then ends thereby halting operation of the self-service checkout terminal 10 during investigation of the user's transaction.

Returning now to step 206 if the user tenders payment within the predetermined time period since removal of the user's items from the post-scan area 17, the routine 58 advances to step 210. In step 210, the processing unit 26 determines that the user has properly completed his or her checkout transaction. Therefore, in step 210 the processing unit 26 causes selective data stored in the transaction table to be printed by the printer 36 thereby generating a receipt for the user. The routine 58 then advances to step 222.

In step 222, the processing unit 26 causes the transaction level weight database to be cleared. In particular, the processing unit 26 communicates with the memory device 27 so as to cause the transaction level weight database stored in the memory device 27 to be cleared or otherwise erased. Hence, when a subsequent user initiates a checkout procedure, the transaction level weight database will be devoid of records. The routine 58 then ends thereby returning the routine 50 to step 52 in which the self-service checkout terminal 10 remains in the idle condition until a subsequent user initiates a checkout procedure.

Returning now to step 202, if the user has not removed his or her items from the post-scan area 17, the routine 58 advances to step 208. Step 208 follows the procedure outline above with regard to step 214. In particular, the processing unit 26 determines if the user has tendered payment. More specifically, the processing unit 26 scans or reads the data communication line 45 in order to determine if the user has charged a cash amount to a credit card with the card reader 30, or reduced an amount stored on a debit, ATM, or smart card with the card reader 30. In addition, the processing unit 26 communicates with the cash acceptor (not shown) in order to determine if the user has inserted currency into the cash acceptor. If the user tenders payment, a payment tendered control signal is generated, and the routine 58 advances to step 224. If the user does not tender payment, the routine 58 loops back to step 202 to monitor removal of the user's items from the post-scan area 17.

In step 224, the processing unit 26 determines that the user has properly completed his or her checkout transaction. Therefore, in step 224 the processing unit 26 causes selective data stored in the transaction table to be printed by the printer 36 thereby generating a receipt for the user. The routine 58 then advances to step 225.

In step 225, the processing unit 26 determines if the user has removed his or her items from the post-scan area 17. In particular, the processing unit 26 communicates with the post-scan shelf scale 20 and the bagwell scale 22 to determine the total weight value of all of the items removed from the post-scan shelf 42b and the bagwell 38, respectively. Thereafter, the processing unit 26 communicates with the memory device 27 to determine the total weight value of the all of items that were placed in the post-scan area 17 as recorded in the transaction level weight database. If the two weight values match, or if the weight value associated with the items removed from the post-scan area 17 is greater than the weight value of the items placed in the post-scan area 17, the processing unit 26 determines that the user removed all of his or her items from the post-scan area 17. Alternatively, the processing unit 26 may determine a pre-transaction weight value indicative of the weight value measured by the post-scan shelf scale 20 and the bagwell scale 22 prior to the itemization step 56. At the end of the transaction, the processing unit 26 determines a post-transaction weight value indicative of the total weight value measured by the post-scan shelf scale 20 and the bagwell scale 22. If the pre-transaction weight value matches or is greater than the post-transaction weight value, the processing unit 26 concludes that the user removed his or items from the post-scan area 17. If the user removed all of his or her items from the post-scan area 17, a bags-removed control signal is generated, and the routine 58 advances to step 226. If the user has not removed all of his or her items from the post-scan area 17, the routine 58 advances to step 227.

In step 226, the processing unit 26 causes the transaction level weight database to be cleared. In particular, the processing unit 26 communicates with the memory device 27 so as to cause the transaction level weight database stored in the memory device 27 to be cleared or otherwise erased. Hence, when a subsequent user initiates a checkout procedure, the transaction level weight database will be devoid of records. The routine 58 then ends thereby returning the routine 50 to step 52 in which the self-service checkout terminal 10 remains in the idle condition until a subsequent user initiates a checkout procedure.

Returning now to step 225, if the user has not removed his or her items from the post-scan area 17 within a predetermined time period, the routine 58 advances to step 227. In step 227, the processing unit 26 causes a message to be displayed on the display monitor 32 which instructs or otherwise reminds the user to remove his or her items from the post-scan area 17 prior to exiting the area proximate the self-service checkout terminal 10. The routine 58 then loops back to step 225 to monitor removal of the user's items from the post-scan area 17.

Returning now to step 200, if the user's grocery cart (i.e. the grocery cart 21) or grocery hand basket (i.e. the grocery hand basket 23) is not empty, the routine 58 advances to step 204. In step 204, the processing unit 26 causes a message to be displayed on the display monitor 32 which instructs the user to remove the additional items from the grocery cart 21 or the grocery hand basket 23, and thereafter enter the additional items into the self-service checkout terminal 10. The routine 58 then ends thereby causing the routine 50 (see FIG. 4) to return to the itemization step 56 in order to monitor the user's entry of the additional items.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, while the transaction level weight database is herein described as being cleared prior to the end of the finalization step 58 (i.e. in steps 220, 222, and 226) and has numerous advantages associated therewith, certain of these advantages may be achieved with other configurations. For example, the processing unit 26 may be configured so as to maintain the records within the transaction level weight database between subsequent users. Hence, the weight values associated with a first user's items may be used to verify the weights associated with a second user's items. It should be appreciated that if configured in such a manner, the transaction level weight database may be cleared periodically so as to reduce the amount of memory needed in the memory device 27 to maintain the transaction level weight database. Moreover, it should be further appreciated that that if configured in such a manner, the transaction level weight database may be cleared in a progressive manner in which the oldest records are displaced by newer records in the transaction level weight database after a predetermined period of time.

In addition, it should be appreciated that the transaction level weight database may also be configured to include records of other measurable characteristics associated with items entered into the self-service checkout terminal 10. For example, the transaction level weight database may be configured to include a record corresponding to the color, size, shape, smell, or texture of an item if the self-service checkout terminal 10 is configured to include a mechanism to measure such characteristics of the item.

What is claimed is:

1. A method of providing security during operation of a checkout terminal, comprising the steps of:
    creating a database during a checkout procedure which includes a first record corresponding to an input item entered into the terminal during the checkout procedure, the first record including (1) a first identification code associated with the input item, and (2) an input weight value corresponding to the weight of the input item;
    determining a second identification code associated with a removal item in response to a user voiding entry of the removal item;
    detecting the weight of the removal item and generating a removal weight value in response thereto; and
    generating a wrong-item-removed control signal if (1) the first identification code is the same as the second identification code, and (2) the input weight value does not match the removal weight value.
2. The method of claim 1, further comprising the steps of:
    updating an electronic log value in response to generation of the wrong-item-removed control signal; and
    comparing the electronic log value to a log threshold and generating a personnel signal in response thereto.
3. The method of claim 1, wherein:
    the terminal includes a first scale, and
    the detection step includes the step of detecting the weight of the removal item with the first scale and generating the removal weight value in response thereto.
4. The method of claim 1, further comprising the step of:
    generating a correct-item-removed control signal if (1) the first identification code is the same as the second identification code, and (2) the input weight value matches the removal weight value.
5. The method of claim 1, further comprising the step of:
    generating a personnel control signal in response to generation of the wrong-item-removed control signal.
6. The method of claim 5, further comprising the step of:
    suspending operation of the terminal in response to generation of the personnel control signal.
7. The method of claim 3, wherein (1) the first scale is positioned in a first area associated with the terminal, (2) the terminal further has a second scale positioned in a second area associated with the terminal, and (3) the first area is located at a position downstream from the second area, further comprising the steps of:
    detecting the weight of the removal item with the second scale and generating a return weight value associated with the weight of the removal item in response thereto; and
    generating a wrong-item-returned control signal if the return weight value does not match the removal weight value.
8. A method of providing security during operation of a checkout terminal, with the terminal having a first scale, comprising the steps of:
    storing a first identification code associated with an input item in a memory in response to entry of the input item into the terminal;
    detecting the weight of the input item with the first scale and storing an input weight value associated with the weight of the input item in the memory in response thereto;
    retrieving a second identification code associated with a removal item from the memory in response to a user voiding entry of the removal item;
    detecting the weight of the removal item with the first scale and generating a removal weight value associated with the weight of the removal item in response thereto; and
    generating a wrong-item-removed control signal if (1) the first identification code is the same as the second identification code, and (2) the input weight value does not match the removal weight value.
9. The method of claim 8, further comprising the step of:
    updating an electronic log value in response to generation of the wrong-item-removed control signal.
10. The method of claim 9, further comprising the step of:
    comparing the electronic log value to a log threshold and generating a personnel signal in response thereto.
11. The method of claim 8, further comprising the step of:
    generating a correct-item-removed control signal if (1) the first identification code is the same as the second identification code, and (2) the input weight value matches the removal weight value.
12. The method of claim 8, further comprising the step of:
    generating a personnel control signal in response to generation of the wrong-item-removed control signal.
13. The method of claim 12, further comprising the step of:
    suspending operation of the terminal in response to generation of the personnel control signal.

14. The method of claim 8, wherein (1) the first stale is positioned in a first area associated with the terminal, (2) the terminal further has a second scale positioned in a second area associated with the terminal, and (3) the first area is located at a position downstream from the second area, further comprising the steps of:

- detecting the weight of the removal item with the second scale and generating a return weight value associated with the weight of the removal item in response thereto; and
- generating a wrong-item-returned control signal if the return weight value does not match the removal weight value.

15. The method of claim 8, wherein:

- the terminal includes a bagwell having a grocery container therein,
- the first scale is configured to detect the weight of the grocery container and any items located therein,
- the step of detecting the weight of the input item includes the step of detecting the weight of the input item when the input item is located within the grocery container, and
- the step of detecting the weight of the removal item includes the step of detecting the weight of the removal item when the removal item is located outside of the grocery container.

16. A checkout terminal, comprising:

- a first weight scale;
- a memory;
- means for storing a first identification code associated with an input item in said memory in response to entry of said input item into said terminal;
- means for detecting the weight of said input item with said first weight scale and storing an input weight value associated with the weight of said input item in said memory in response thereto;
- means for retrieving a second identification code associated with a removal item from said memory in response to a user voiding entry of said removal item;
- means for detecting the weight of said removal item with said first weight scale and generating a removal weight value associated with the weight of said removal item in response thereto; and
- means for generating a wrong-item-removed control signal if (1) said first identification code is the same as said second identification code, and (2) said input weight value does not match said removal weight value.

17. The checkout terminal of claim 16, further comprising:

- means for updating an electronic log value in response to generation of said wrong-item-removed control signal; arid means for comparing said electronic log value to a log threshold and generating a personnel signal in response thereto.

18. The checkout terminal of claim 16, further comprising:

- means for generating a correct-item-removed control signal if (1) said first identification code is the same as said second identification code, and (2) said input weight value matches said removal weight value.

19. The checkout terminal of claim 16, further comprising:

- means for generating a personnel control signal in response to generation of said wrong-item-removed control signal; and
- means for suspending operation of said terminal in response to generation of said personnel control signal.

20. The checkout terminal of claim 16, further comprising:

- a second weight scale;
- means for detecting the weight of said removal item with said second scale and generating a return weight value associated with the weight of said removal item in response thereto; and
- means for generating a wrong-item-returned control signal if said return weight value does not match said removal weight value,
- wherein (1) said first weight scale is positioned in a first area associated with said terminal, (2) said second weight scale is positioned in a second area associated with said terminal, and (3) said first area is located at a position downstream from said second area.

21. The checkout terminal of claim 16, further comprising:

- a bagwell having a grocery container therein, wherein said first weight scale is configured to detect the weight of said grocery container and any items located therein;
- means for detecting the weight of said input item when said input item is located within said grocery container; and
- means for detecting the weight of said removal item when said removal item is located outside of said grocery container.

* * * * *